US009374826B2

(12) United States Patent
Kaichis et al.

(10) Patent No.: US 9,374,826 B2
(45) Date of Patent: Jun. 21, 2016

(54) SYSTEM AND METHOD FOR OPTIMIZING WIRELESS NETWORK ACCESS

(71) Applicant: WIREIE HOLDINGS INTERNATIONAL INC., Richmond Hill (CA)

(72) Inventors: George Kaichis, Markham (CA); Younes Zeroual, Etobicoke (CA); Tim Brown, Creemore (CA)

(73) Assignee: WIREIE HOLDINGS INTERNATIONAL, INC., Richmond Hill, Ontario (CA)

( * ) Notice: Subject to any disclaimer, the term of this patent is extended or adjusted under 35 U.S.C. 154(b) by 0 days.

(21) Appl. No.: 14/397,774

(22) PCT Filed: May 3, 2013

(86) PCT No.: PCT/CA2013/000441
§ 371 (c)(1),
(2) Date: Oct. 29, 2014

(87) PCT Pub. No.: WO2013/163745
PCT Pub. Date: Nov. 7, 2013

(65) Prior Publication Data
US 2015/0103769 A1   Apr. 16, 2015

Related U.S. Application Data

(60) Provisional application No. 61/642,151, filed on May 3, 2012.

(51) Int. Cl.
*H04W 72/04* (2009.01)
*H04W 16/04* (2009.01)
*H04W 24/02* (2009.01)
*H04L 5/00* (2006.01)

(52) U.S. Cl.
CPC ......... *H04W 72/0486* (2013.01); *H04L 5/0096* (2013.01); *H04W 16/04* (2013.01); *H04W 24/02* (2013.01)

(58) Field of Classification Search
CPC . H04W 16/04; H04W 72/0486; H04W 24/02; H04L 5/0096
See application file for complete search history.

(56) References Cited

U.S. PATENT DOCUMENTS

| | | | | |
|---|---|---|---|---|
| 2010/0144363 | A1* | 6/2010 | De Rosa | H04W 52/0206 455/452.1 |
| 2013/0210447 | A1* | 8/2013 | Moe | H04W 72/0486 455/453 |

* cited by examiner

*Primary Examiner* — Jianye Wu
(74) *Attorney, Agent, or Firm* — Norton Rose Fulbright Canada LLP

(57) ABSTRACT

A platform is provided for connecting to two or more Radio Access Networks ("RAN"). The platform includes a session manager that acts as a central resource. The session manager links to the RANs through one or more controllers, a controller being associated with each RAN to enable monitoring of supply and demand for network resources in relation to the two or more RANs in a defined location. The session manager is operable to apply one or more rules for sharing available network resources across the two or more RANs on a real time or near real time basis thereby providing improve network resource utilization across the two or more RANs and for the respective customers of the two or more RANs in the defined location.

19 Claims, 18 Drawing Sheets

| Activity | Duplex Mode | Symmetry | Bandwidth Required |
| --- | --- | --- | --- |
| Web Browsing | Half/Full | Asymmetrical | Low |
| Video Conferencing | Full | Symmetrical | Medium to High |
| Audio or Video Streaming | Half duplex/Simplex | Highly Asymmetrical | Medium to very High |

FIG.10

SYSTEM AND METHOD FOR OPTIMIZING WIRELESS NETWORK ACCESS

CROSS REFERENCE TO RELATED APPLICATIONS

This application claims all benefit, including priority, of U.S. Provisional Patent Application Ser. No. 61/642,151, filed May 3, 2012, entitled SYSTEM AND METHOD FOR OPTIMIZING WIRELESS NETWORK ACCESS, the entire contents of which is incorporated herein by this reference.

FIELD OF THE INVENTION

The present invention relates generally to wireless networks. The present invention further relates to wireless network performance optimization.

BACKGROUND OF THE INVENTION

RF resources are a finite commodity in high demand, especially in particular high demand areas where mobile device clusters tend to form, which places demands on available RF resources that often result in various network performance issues including dropped calls and unavailability to a mobile device of a wireless link.

In recent years demand for wireless voice services has either increased marginally, or in some markets levelled off. Coinciding with this trend, however, has been an exponential increase in demand for data services.

As illustrated for example in FIG. 1, each wireless network operator is licensed blocks of radio frequency spectrum for the respective operator's radio access network ("RAN"). With that in mind, at a given instant, in a given location, the operator in Block A may experience a lull in RAN demand for data services, while the operator in Block B is overwhelmed with traffic. The next moment, the reverse could be true. Afterwards, both RANs could be momentarily idle.

This dynamic is multiplied by the number of wireless operators and active bands operating in a given service area. Because of the transient, episodic nature of data communications, there is a chaotic nature to the demand for, and availability of, RF resources.

Over and above the sheer increase in demand, data sessions behave very differently from voice calls in the following ways: (i) voice is circuit switched, data is packet switched; (ii) voice is full-duplex, whereas data can be full or half duplex, or even simplex in certain applications; (iii) data sessions are based on protocols that tolerate a degree of network disruption without the application failing or closing, while a mere syllable lost in a voice call is perceptible, and unacceptable to the user; (iv) the routing of data packets is highly dynamic whereas the routing of voice sessions is rigidly predefined and predictable.

These, and other characteristics, present both challenges and opportunities in terms of mobile service radio spectrum utilization. Innovation in the domain of network performance optimization has tended to focus on various technologies or techniques implemented network by network such a bandwidth optimization.

Certain network providers have tried to address exhaustion of RAN resources in specific areas by deploying Wi-Fi Access Points (AP) as a means of offloading traffic in certain congested areas. However, there are a number of important characteristics inherent in Wi-Fi that lead to a departure from the experience a user expects from a Mobile Network Operator (MNO): (i) small coverage (originally intended for use within a home or small business); (ii) unlicensed, meaning there is no reliable way of managing interference; (iii) non-assured service quality (best effort); (iv) performance rapidly deteriorates as the number of users increases; (v) no support for mobility; (vi) unpredictable and inconvenient support for nomadic user behavior; (vii) user confusion/uncertainty with regards to whether they are on the cellular network (being charged), or Wi-Fi (no charge, but no service level assurance) at any given instant; and (viii) often impractical for the MNO to charge for Wi-Fi in macro network service areas.

Accordingly, there is a need for a new solution that provides better utilization of available network resources in a defined location.

SUMMARY OF THE INVENTION

In accordance with an aspect of the present invention, the Radio Access Network ("RAN"), the link between an end user and the wireless network base station, in used in new, unconventional ways in order to attempt to improve utilization of available network resources.

In accordance with an aspect of the present invention, a computer network implemented platform is provided comprising: one or more server computers that include or link to one or more computer program components that define a Radio Access Network ("RAN") access optimizer, wherein: (A) the one or more server computers are linked to two or more RAN networks, by means of at least one controller; (B) the controller is configured to obtain supply/demand information for each of the linked RAN networks; (C) based on the supply/demand information, in real time or near real time, and also based on RAN resource sharing rules that determine the modalities of sharing of RAN resources across the linked RAN networks in a way that optimizes RAN resource utilization across the linked RAN networks; and (D) based on the determination of (iii), the optimizer determines a set of instructions that are configured to enable the linked RAN networks to implement the RAN resource utilization optimized across the linked RAN networks so as to provide an improved network performance experience to a user of a mobile device in a defined location that is served by the linked RAN networks, regardless of which of the RAN networks is the provider to a particular user.

In accordance with an aspect of the present invention there is provided a system for optimizing network performance of a mobile device, the system comprising: at least one) computer server linked to at least two Radio Access Networks ("RANs") by at least one RAN resource controller, the at least two RANs serving at least one mobile device in a predefined service area; wherein the at least one computer server is configured to: receive RAN resource utilization information for each linked RAN from the at least one RAN resource controller; determine a re-allocation of utilization of RAN resources by the at least one mobile device across the linked RANs in real-time or near real-time based at least partly on the RAN resource utilization information and on predetermined RAN resource sharing rules; generate instructions for the linked RANs in accordance with the determined re-allocation to enable the linked RANs to implement the determined RAN resource utilization re-allocation; and transmit the generated instructions to the respective RANs.

In accordance with another aspect of the present invention, there is provided a method of optimizing network performance of a mobile device, performed by a computer server, the method comprising: receiving from at least one RAN resource controller RAN resource utilization information for at least two Radio Access Networks ("RANs") each linked to the computer server, the at least two RANs serving at least one mobile device in a predefined service area; determining a re-allocation of utilization of RAN resources by the at least one mobile device across the linked RANs in real-time or near real-time based at least partly on the RAN resource utilization information and on predetermined RAN resource sharing rules; generating instructions for the linked RANs in accordance with the determined re-allocation to enable the linked RANs to implement the determined RAN resource utilization re-allocation; and transmitting the generated instructions to the respective RANs.

In accordance with another aspect of the present invention, there is provided a non-transitory computer program product for optimizing network performance of a mobile device, the non-transitory computer program product tangibly embodying code that, when executed by a processor of a computer server, causes the processor to: receive from at least one RAN resource controller RAN resource utilization information for at least two Radio Access Networks ("RANs") each linked to the computer server, the at least two RANs serving at least one mobile device in a predefined service area; determine a re-allocation of utilization of RAN resources by the at least one mobile device across the linked RANs in real-time or near real-time based at least partly on the RAN resource utilization information and on predetermined RAN resource sharing rules; generate instructions for the linked RANs in accordance with the determined re-allocation to enable the linked RANs to implement the determined RAN resource utilization re-allocation; and transmit the generated instructions to the respective RANs.

In accordance with another aspect of the present invention, there is provided a system for optimizing network performance of a mobile device, the system comprising: at least one computer server linked to at least two Radio Access Networks ("RANs") by at least one RAN resource controller, the at least two RANs serving at least one mobile device in a predefined service area; wherein the at least one computer server is configured to: receive RAN resource utilization information for each linked RAN from the at least one RAN resource controller; and transmit the received RAN resource utilization information to each of the linked RANs; wherein the at least two RANs are respectively configured to: re-allocate utilization of RAN resources by the at least one mobile device across the linked RANs in real-time or near real-time based at least partly on the RAN resource utilization information and on predetermined RAN resource sharing rules.

In accordance with another aspect of the present invention, there is provided a method of optimizing network performance of a mobile device, the method comprising: a computer server receiving from at least one RAN resource controller RAN resource utilization information for at least two Radio Access Networks ("RANs") each linked to the computer server, the at least two RANs serving at least one mobile device in a predefined service area; the computer server transmitting the received RAN resource utilization information to each of the linked RANs; and the linked RANs respectively re-allocating utilization of RAN resources by the at least one mobile device across the linked RANs in real-time or near real-time based at least partly on the RAN resource utilization information and on predetermined RAN resource sharing rules.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

In the drawings, embodiments of the invention are illustrated by way of example. It is to be expressly understood that the description and drawings are only for the purpose of illustration and as an aid to understanding, and are not intended as a definition of the limits of the invention.

FIG. 10 illustrates possible network resource requirements of types of activities.

DETAILED DESCRIPTION

Figure 1:
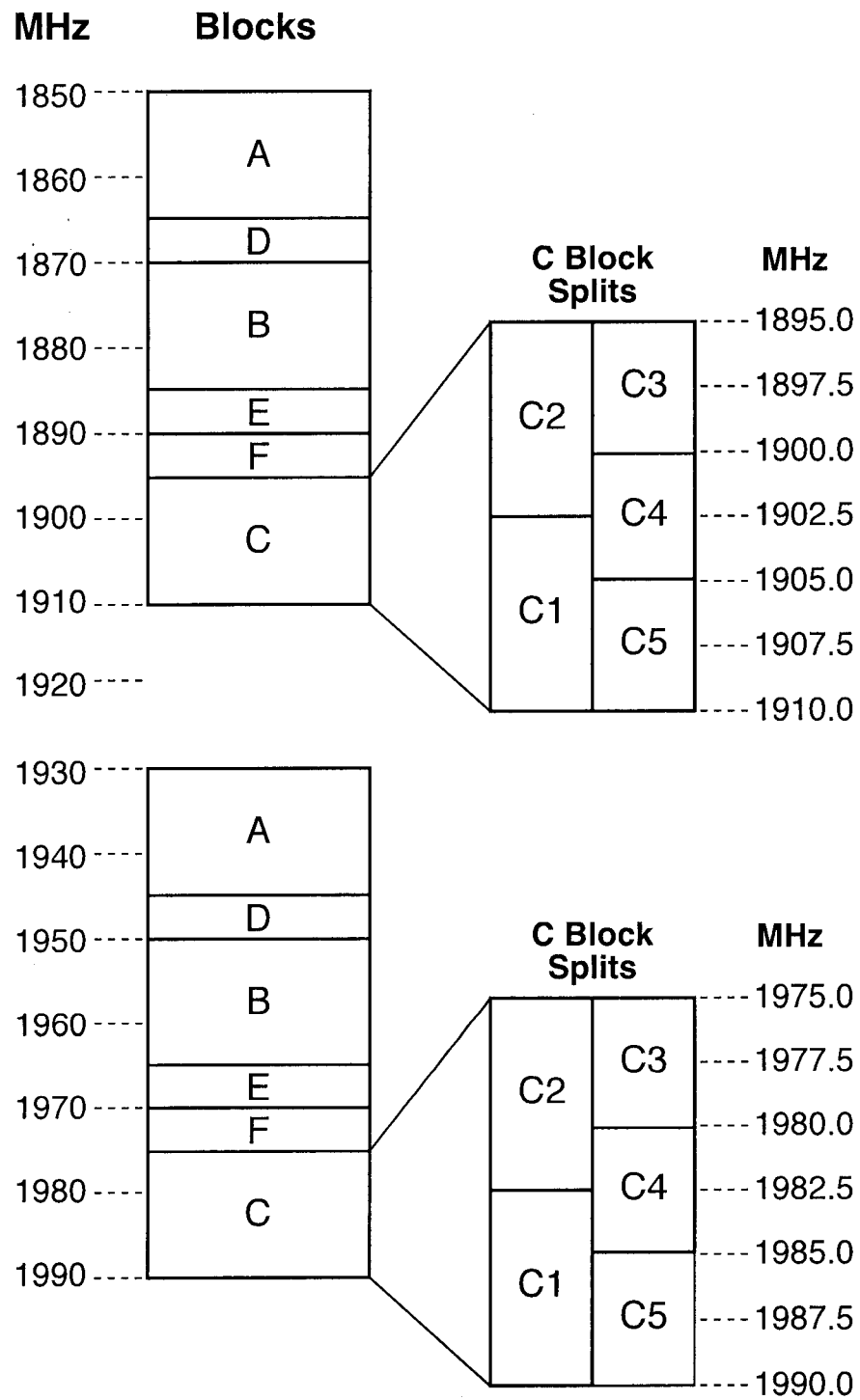
FIG. 1 illustrates example RF bandwidth allocations across different carriers.

The term "mobile device" as used in this disclosure refers to any manner of wireless device including computing resources capable to initiate the functions described.

A computer network implemented platform is provided for optimizing Radio Frequency ("RF") resources across two or more Radio Access Networks ("RAN"). The platform includes an Inter-RAN Spectrum Optimizer ("I-RSO") that dynamically manages supply and demand across two or more RANs. The platform includes an application layer that is configured to monitor the two or more RANs and extract real time or near real time supply and demand information, and use this supply and demand information to assign RF resources across the two or more RANs to address current requirements. In one aspect of the invention, the operator of the platform develops an understanding with the two or more RANs that includes the RANs enabling the operator to assign resources based on the best possible network performance result for a plurality of mobile devices requiring RF resources at a particular time, regardless of the particular RAN with whom a consumer associated with a mobile device is associated, for example by means of a subscriber relationship. Further details regarding the platform are provided below.

In accordance with an aspect of the present invention, network performance can be improved for two or more RANs by providing a system that enables the two or more RANs to leverage off of each other's network, based on predetermined rules. A mechanism is provided for establishing a functional layer, linked to the two or more RANs, enabling the defined collaboration for cross-RAN optimization of traffic in a way that may be desirable notwithstanding that the two or more RANs are generally associated with competing wireless carriers, or Mobile Network Operators ("MNOs"). RANs may be configured for use with a particular network type, such as LTE. The present invention is not intended to be limited to any particular RAN type, and may be further adapted for use with future RAN types as well. Where the term network provider, operator, or wireless carrier is used, this may be interpreted to have the same meaning as a MNO.

A dynamic spectrum allocation and channel aggregation solution of the present invention may enable MNOs to share the responsibility of serving a user at times and/or locations where one MNO cannot fully serve the user. The radio frequency spectrum often underutilized meaning that significant portions of the precious radio spectrum purchased by a certain MNO is not being used by any users of that MNO. At the same time and location, there could be users of other MNOs which may be in urgent need of service; however, their own MNO might have limited or no bandwidth to offer at that time and/or location. This problem may be addressed by developing physical layer technologies with the ability to dynamically allocate radio spectrum frequencies for servicing mobile devices.

In current cellular networks, the radio spectrum is split into distinct, non-overlapping frequency bands that are allocated to different MNOs. This static frequency allocation causes non-optimal usage of resources. To optimize resource allocation, spectrum usage should be more flexible and efficiently used. This may be possible by establishing some cooperation among MNOs whereby channel aggregation among different mobile networks leads to maximal spectrum utilization.

Different strategies can be defined to model channel aggregation among different MNOs. To establish channel aggregation, a control center may be tasked with two responsibilities: (1) exchanging information about channels owned by different networks; and (2) allocating those channels to different users. Based on the role and acceptable complexity of this control center, two different approaches to channel aggregation are considered: centralized and decentralized methods. In a centralized approach, the control center is responsible for both tasks 1 and 2. In a decentralized approach, the control center facilitates the exchange of information about different channels among different MNOs. Each network decides about its own available resources and user channel allocation.

Another approach to channel aggregation relies on game theory. In this approach, each MNO is considered to be an economic entity which aims to maximize its revenues by choosing proper user serving strategies possibly unknown to other networks. Analyzing this type of resource allocation can be done by modeling the problem as a game where different networks are the game players. Game theoretic methods are decentralized by its nature.

Users of a mobile network may be grouped into two general types: (1) primary users which have higher priority and low to modest bandwidth demands; and (2) secondary users with low priority and high bandwidth demands.

Where a control center optimally allocates resources to a whole network which consists of different sub-networks operated by different MNOs, the total network throughput may be considered as a design objective. This approach may be called a centralized method. The present invention may attempt to maximize the total throughput in the network under these constraints: (i) power budget for each user in any network; (ii) a minimum guaranteed rate for each primary user; (iii) a maximum allowable cost incurred by each MNO for secondary users; and (iv) orthogonal frequency allocation among users and MNOs. Possible design constraints related to the centralized method may include: (i) mobile device maximum power limitation for transmission; (ii) each primary user may have a minimum rate requirement (that may be application dependent), which may need to be guaranteed for primary users, to keep the network reliable; (iii) each secondary user may have a cost limit (could come from MNO and/or user) for spectrum leasing; (iv) each frequency channel can only be allocated to one of networks/users to avoid any interference.

"Power budget" refers to the power limit, or maximum amount of power can be used at transmitter.

"Guaranteed rate" refers to the rate at which a service provider ensures to deliver communications.

"Maximum allowable cost" refers to the cost (payment) limit of each (secondary) user (for spectrum leasing).

"Orthogonal frequency" refers to non-overlapping frequency channels.

Where a control center informs each MNO about spectrum vacancies in other MNOs, each MNO may decide, on its own, whether or not to lease/rent frequencies to/from other MNOs. This approach may be called a decentralized method. The MNO utility function may be defined as the achievable rate, minus costs incurred due to renting. The present invention may attempt to maximize this utility function under the following constraints: (i) power budget for each user in any network; (ii) a minimum guaranteed rate for each primary user; and (iii) orthogonal frequency allocation among users and MNOs. The MNO utility function may be understood as a metric that a MNO uses as a performance measure of the network for optimization based on the system input parameters. It can be for example a weighted sum rate over all users.

The interaction among different MNOs may also be modeled as a selfish game with the following elements: (i) set of players being the set of sub-networks; (ii) set of strategies being, for a network whether or not to rent out its own frequencies, and whether or not to lease frequencies from other MNOs based on pure or mixed strategies; and (iii) utilities: utility for each MNO may be the achievable rate plus revenue gained from frequencies leasing minus the cost of renting out frequencies.

An example of a "mixed strategy" includes: assume two specific frequency channel allocation strategies A and B. The network chooses A x% time and B (100-x)% of the time.

An example of a "pure" strategy includes: following the above example, the network chooses A (or B) 100% of the time.

One aspect of the platform of the present invention is a session manager component that may include: (A) a host computer implemented in a way that is associate with a network core, and (B) two or more controller components, each controller component being linked to the session manager, and where optionally each controller is implemented at the network edge.

The controller is configured to evaluate spectrum supply and demand in real time, and assign resources accordingly. The platform can accommodate variations on this basic operational concept based on predefined business, engineering and operational rules.

One mechanism for assigning resources may be frequency channel exchanging. The event should be triggered by a MNO. A mobile device may remain under control of its own network, however, it may receive a control message related to frequency assignment (based on assignment of resources in accordance with the present invention), and based on the control message move from one frequency range to another for transmission. A skilled reader will understand that frequency assignment may be implemented using for example a signaling and aggregation protocol, as well as a channelization design.

The parameters for determining management of the mobile device after it has moved to another frequency range for transmission may depend on the particular implementation of the invention. These parameters may depend on network traffic dynamics, channel dynamics, amount of control overhead.

In one possible implementation, the mobile device listens to the control channels for each of the networks in order to determine which network to use based on the frequency assignment.

The host computer may include or link to clearing and settling system or environment that may utilize for example Charging Data Records (CDR). The clearing and settling system may be used to manage charges by RAN A to RAN B for RAN A carrying specific network traffic for RAN B. The charging, clearing and settling parameters may be defined in an agreement negotiated between the MNO and RAN A and RAN B. The clearing and settling system may for example integrate with the billing systems of each of RAN A and RAN B.

One aspect of the invention, is that RAN spectrum is regarded, and based on the technology described managed, as one large pool, and in essence the user community is also looked at as one large pool. The present invention enables improvement of RAN availability on a per user basis. By extension, the collective user community enjoys much greater throughput by virtue of increased bandwidth. In addition, transient 'bursts' based on surplus RAN resource availability are leveraged by the platform of the present invention to provide enormous instantaneous performance improvements that would not otherwise be available.

A skilled reader will understand that the idea of competitors sharing RAN resources may seem unlikely but in fact the complaints regarding network performance in congested areas are causing very negative customer experiences for a number of carriers which can result in customer exits that carriers are very motivated to avoid. Also, the improvement of network performance in congested areas using prior art methods either does not work well or the cost is prohibitive. There is a significant opportunity for an entity that can broker limited collaborative relationships between competitors. The present invention provides the technological solution for enabling such collaboration. It is also noted that in certain jurisdictions the system described in this disclosure may be mandated by a regulatory entity for example.

In one aspect of the invention, the platform creates, by linking to two or more RANs, a pooled resource including multiple RANs, shared by two or more MNOs in a given service area. The intent is to have aggregate RAN utilization evenly distributed such that congestion on a given channel is dramatically reduced, or ideally, eliminated.

Usage Models

Figure 2A:
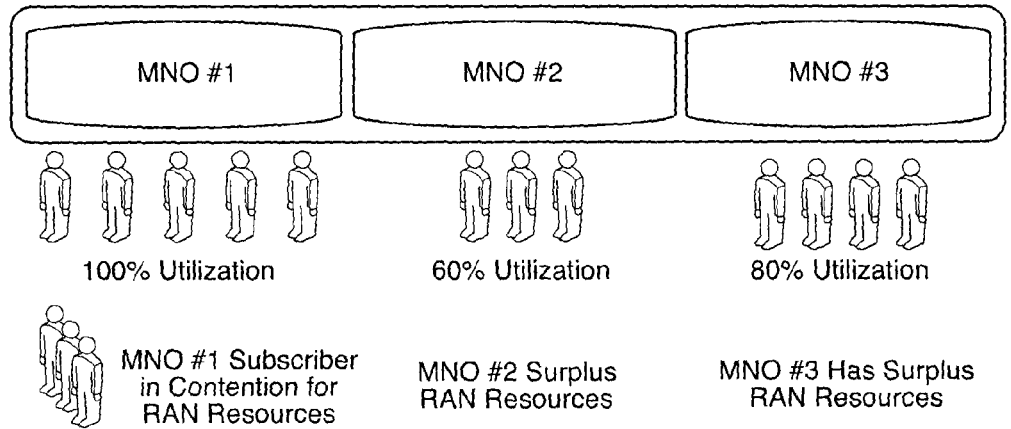
FIGS. 2a and 2b illustrate allocation of RF resources between three carriers based on prior art approaches.

FIG. 2a depicts a fictitious (and greatly simplified) single RAN band where each MNO is licensed an equal amount of spectrum. This is the model used throughout the world today. At this given location, in this given moment in time, MNO #1 has exhausted its RAN resources. In fact, there is contention amongst MNO #1's subscribers for RAN resources. In the meantime, MNO #2 and #3 have surplus RAN capacity. In addition to being spectrally inefficient, this is naturally a source of aggravation for MNO #1's subscribers.

Figure 2B:
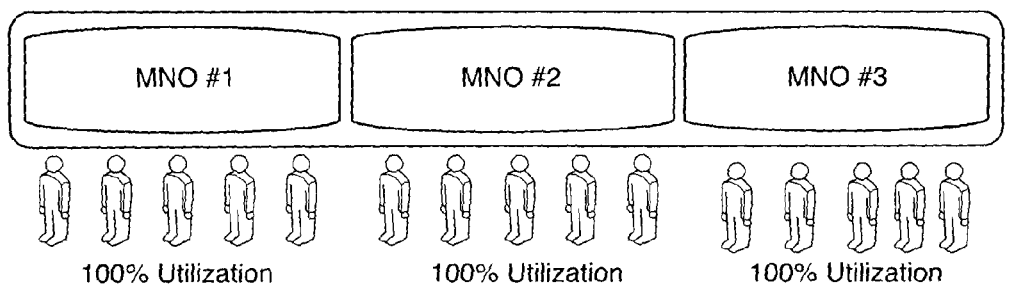

Many would agree that in an ideal world, the RAN user base would be distributed as shown in FIG. 2b. This is a service provider agnostic model where RAN supply and demand are optimally matched. It is also more spectrally efficient.

Figure 2C:
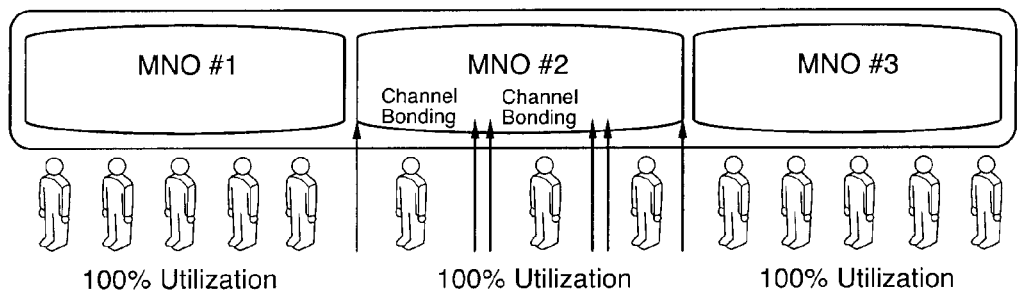
FIG. 2c shows improved allocation of RF resources using prior art bonding techniques.

Taking the concept a step further, imagine that MNO #1 and #3 are at 100% utilization, but MNO #2 for an instant in time, at a specific location, has surplus RAN capacity. As depicted in FIG. 2c, through intelligent intra-MNO channel bonding, the user base could enjoy a performance improvement as a result of this spare capacity. Once again, we'd see 100% utilization of the band.

Figure 2D:
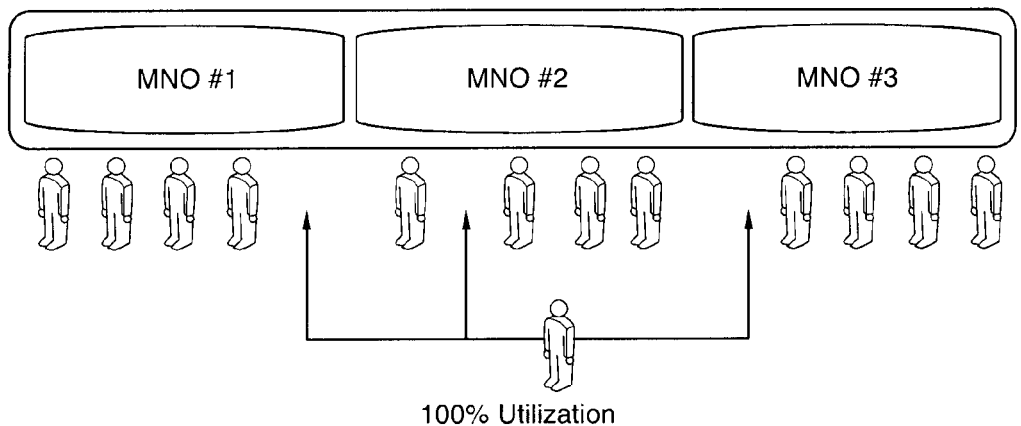
FIG. 2d illustrates one aspect of the present invention, in which supply/demand across three carriers is shared for improved utilization across the three carriers.

However, depending on network parameters, this may not be enough, and it may be desirable to co-opt resources of an associated MNO, in effect pooling RAN resources so as to provide for example inter-MNO channel bonding. In FIG. 2d, a subscriber with MNO #3 gets maximum access to collective RAN resources regardless of where those resources reside (in other words, MNO agnostic). We can see that a channel from each MNO (including his/her 'home' MNO) is bonded to provide an aggregate of three channels of bandwidth.

We also see that band utilization is at 100%. The concept of engineering a network to maintain 100% utilization for as much of the time as possible is a shift from traditional circuit switched voice channel engineering where network resources are provisioned for 'busy hour'. With this usage model, many of the resources are idle outside of busy hour—either generating no revenue, or perhaps being repurposed for lower revenue applications and services.

Session Management

One aspect of the platform is a session management platform or resource that provides instantaneous assessment of RAN resources, along with the subsequent decisions with regards to assignment of RAN resources. The session manager of the present invention, in one implementation, is MNO agnostic in that RAN resources are assigned based on aggregate supply and demand. Also, demand isn't merely the request for an RF channel. In the environment envisioned, in one implementation, OSI Layer 6 and 7 help define the nature of the application, and with that, reserve and assign bandwidth accordingly. The examples below have different network resource requirements. The table of FIG. 10 shows the different network resource requirements of types of activities.

In light of the characteristics of most data communication sessions, transactions at Layer 1 and 2 are generally bursty and transient, but as the chart above shows, there are exceptions. Significantly, it is in the non-bursty categories where the greatest growth in demand for mobile network bandwidth resides.

One aspect of the invention, and in particular the Inter-RAN Spectrum Optimizer (I-RSO), is to pool aggregate RF resources in a given service area. The assumption is that participating MNOs will not relinquish the spectrum they've been previously licensed. Accordingly, those subscribers loyal to a given MNO would not be expected to make any changes with regards to the relationship with their MNO. In fact, from a business and customer relationship perspective, introducing the I-RSO would be transparent to the user—other than the improvements in RAN performance. The average user is likely to attribute the improvements to their 'home' MNO.

Figure 3:
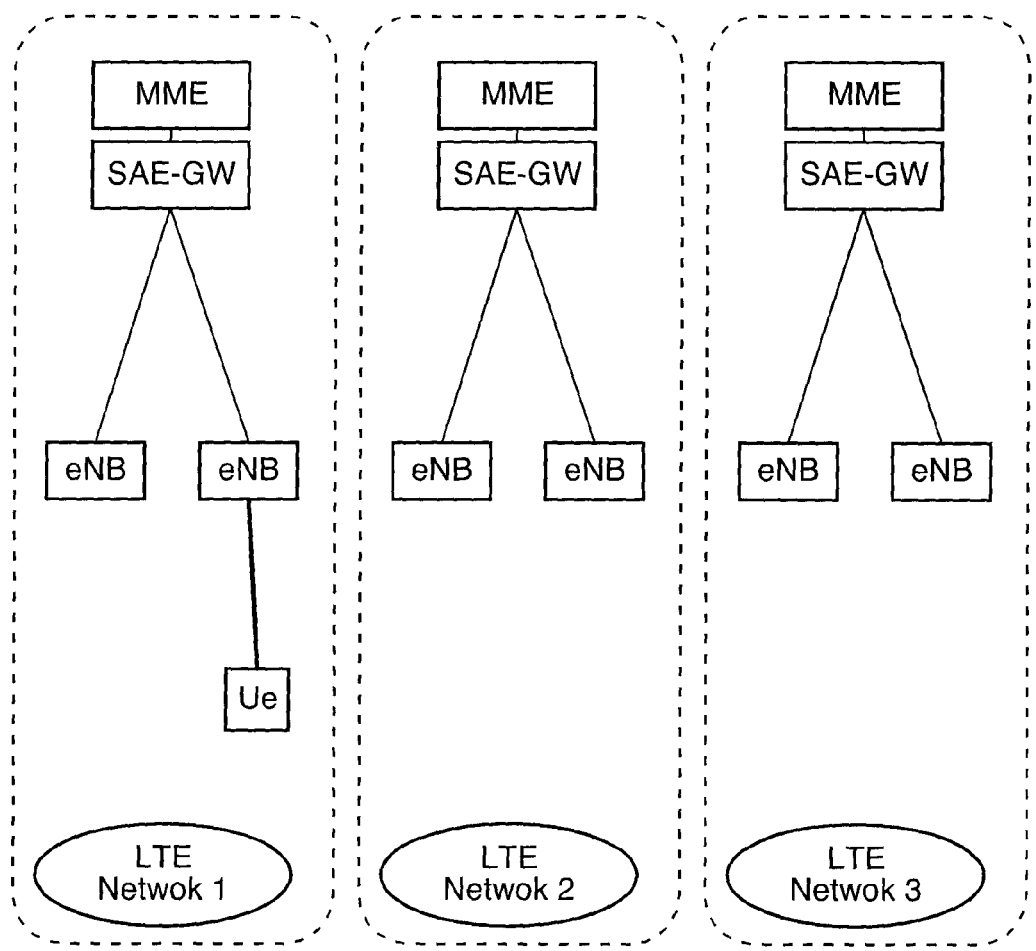
FIG. 3 illustrates a wireless network resource architecture according to prior art approaches.

FIG. 3 depicts the current situation as between three representative MNOs. FIG. 3 depicts three disparate LTE networks in a given service area with a user (Ue) on the brown network confined by the RAN resources on his/her most favorable cell/sector. The Ue is in a high-demand data session and experiencing poor performance because of limited bandwidth on the RAN. At this same moment, there is spare RAN capacity on the neighboring brown network cell, but there is also spare RAN capacity on the networks his/her home network competes against. Although LTE RANs are described in FIG. 3, the present invention may be adapted for use with other RAN types as well.

Optimizing RAN Utilization with I-RSO

Figure 4:
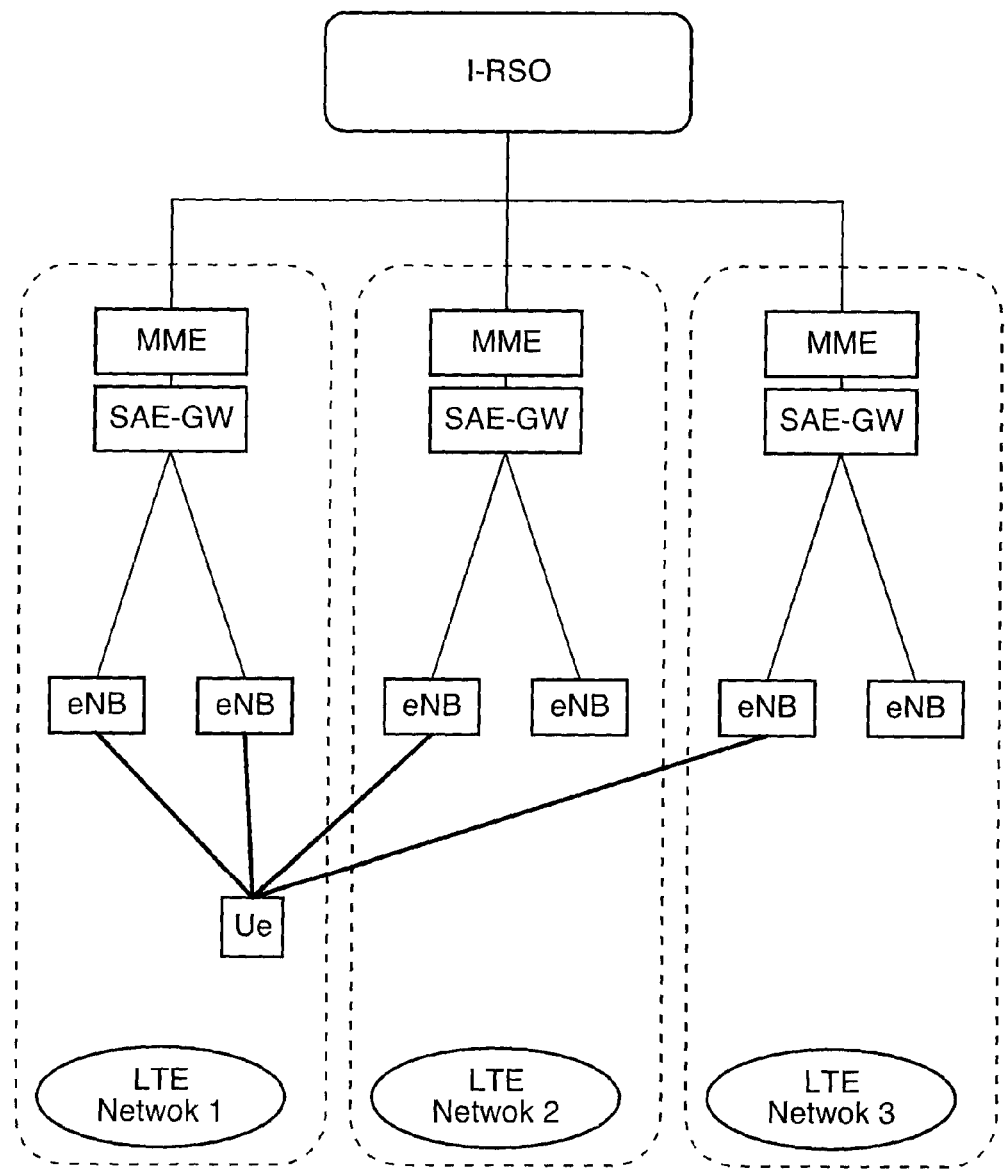
FIG. 4 illustrates a local wireless network resource architecture that includes a session manager according to the present invention.

FIG. 4 depicts the same Ue, along with the same three disparate LTE networks. This time, however, bandwidth is aggregated from the blue and pink network. The Ue also benefits from an additional channel on its home network.

Figure 5:
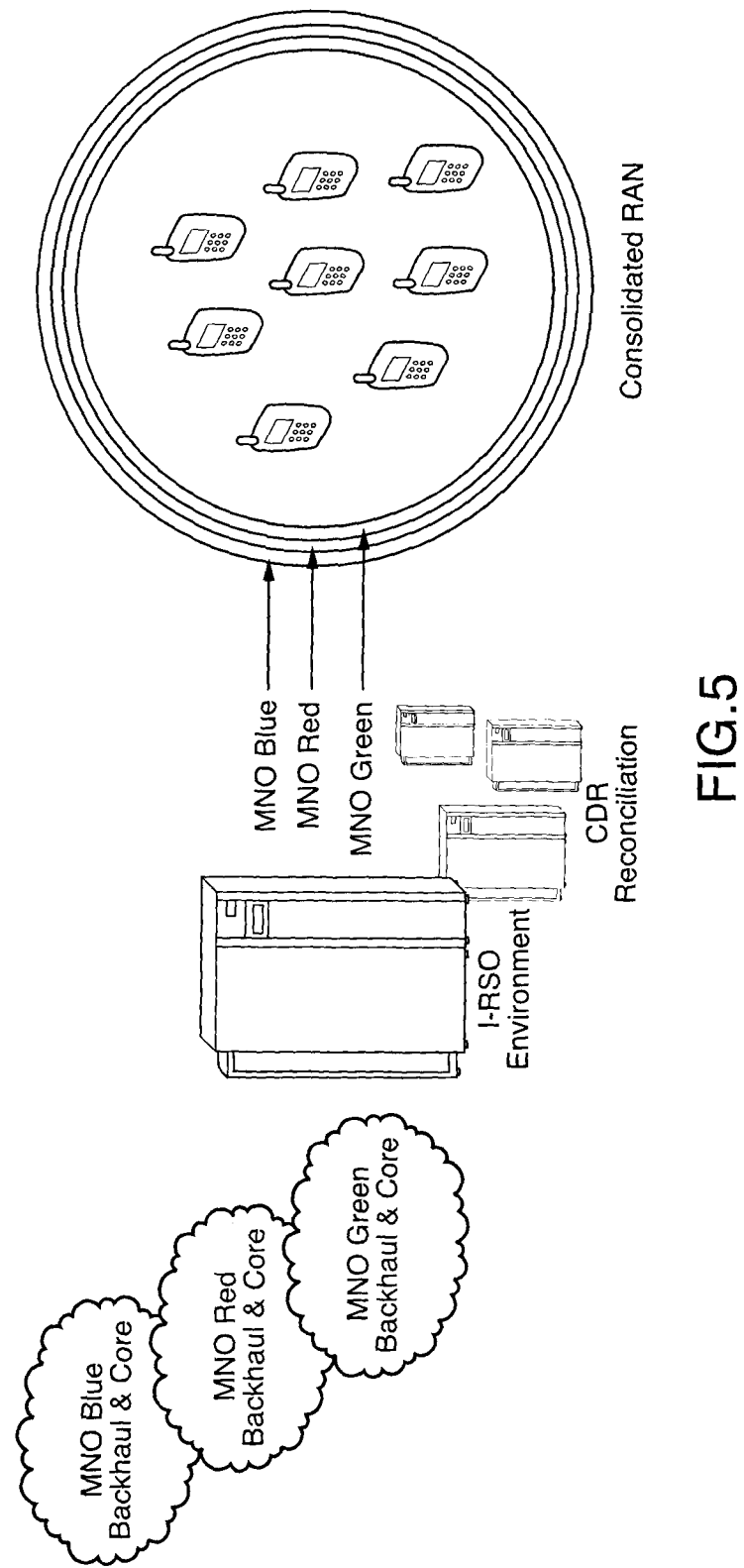
FIG. 5 illustrates a computer system for implementing the technology of the present technology.
Figure 6:
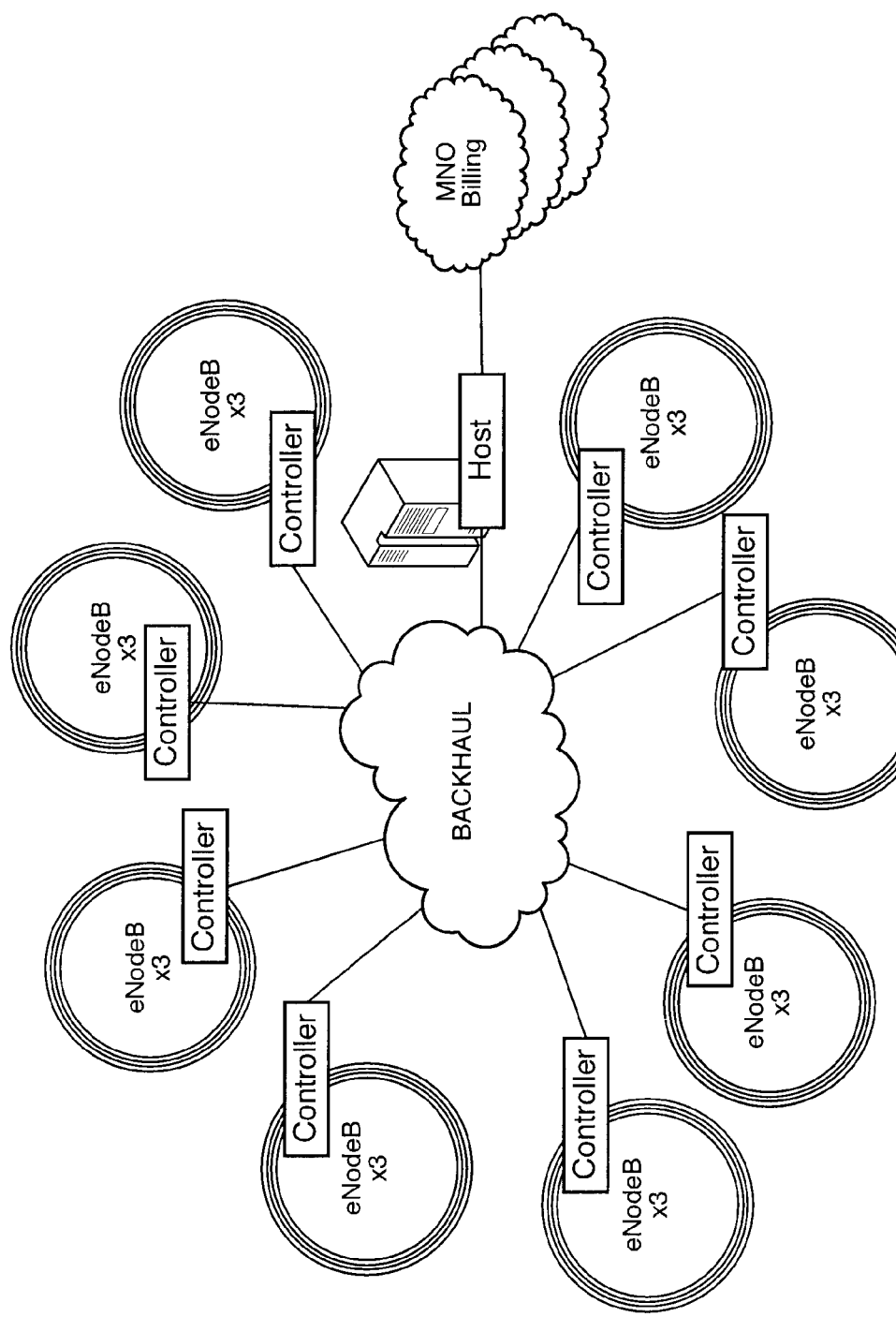
FIG. 6 illustrates a representative system resource view of the system of the present invention.

FIG. 5 depicts the I-RSO relationships at a high level. In one implementation, the platform may be implemented as an I-RSO computer network implemented environment that includes (A) a session host, and (B) a plurality of session controllers. As shown in FIG. 6, the session host, which may be implemented using one or more server computers, is operable to define a series of one-to-many relationships in which the session host acts as a central resource and enables interactions as between two or more wireless networks through the controllers associated with each of the two or more wireless networks, and the link between each of the controllers and the session host.

A skilled reader will appreciate that LTE/SAE (Long Term Evolution/System Architecture Evolution) base stations are used for demonstration purposes only but many other options are available. The I-RSO is RAN technology agnostic, however—meaning that a combination of disparate radio access standards (e.g.: HSPA, HSPA+, White Spaces, Wi-Fi could be bonded at a given instant, in a given location.

Session Controller Functions

As shown in FIG. 6 for example, located at the RAN edge, the Session Controller is connected to all participating eNodeBs in a given serving area (i.e.: cell/sector). In this example, MNO Blue, MNO Red and MNO Green are participants. The Session Controller's role is to constantly and instantaneously evaluate aggregate RF resource supply and demand for its cell/sector. Based on business and operational rules preloaded from the I-RSO Host, the Session Controller allocates RF resources appropriately.

These activities are time sensitive in light of the highly dynamic nature of RF resource supply and demand in data communications applications.

A less time sensitive, yet critical function is the Session Controller's other role of delivering Charging Data Records (CDR) to the Session Host (next section).

Session Host Functions

Figure 7:
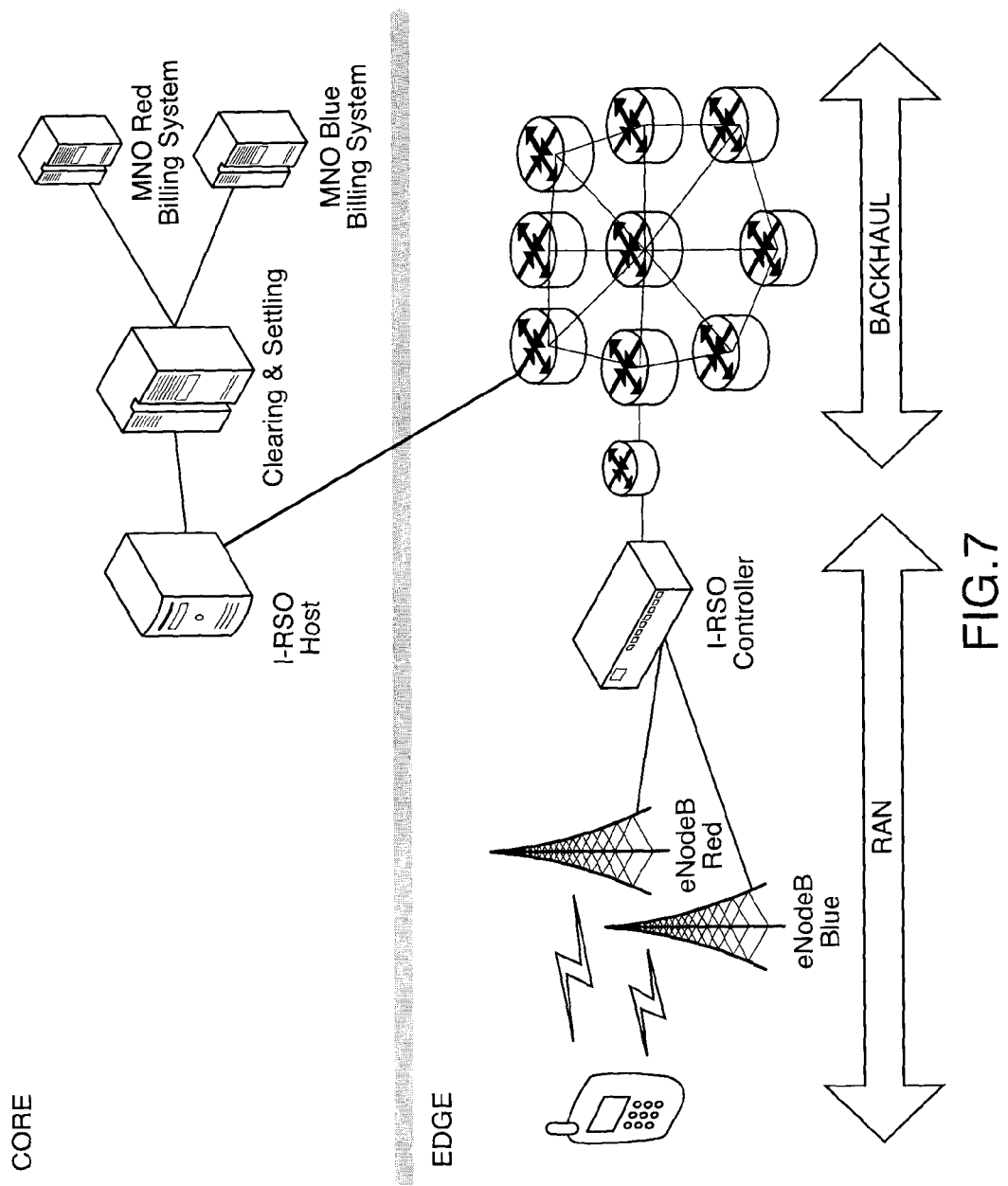
FIG. 7 illustrates a further system resources view of the overall platform of the present invention.

As best shown in FIG. 7, the Session Host is the operational management and administrative foundation of the I-RSO. Roles include: (i) storage and loading of operating parameters to all participating Session Controllers; (ii) O & M environment in support of Session Controllers, along with the Host itself; (iii) database of CDRs delivered from all associated Session Controllers; and (iv) CDR reconciliation engine to ensure RAN usage reporting is delivered accurately to the appropriate MNO billing environment.

Implementation Model, Single Location, Two Participating MNOs

The Controller operates at the RAN edge of all participating MNOs. Operational parameters are loaded locally on all participating eNodeBs (radio base stations). The I-RSO Controller constantly evaluates spectrum supply and demand on each eNodeB. It is the instantaneousness of RAN resource allocation that makes it necessary to deploy the I-RSO Controller at the network edge.

Inter-RAN Spectrum Optimizer (I-RSO) Controller Message Flow

Figure 8:
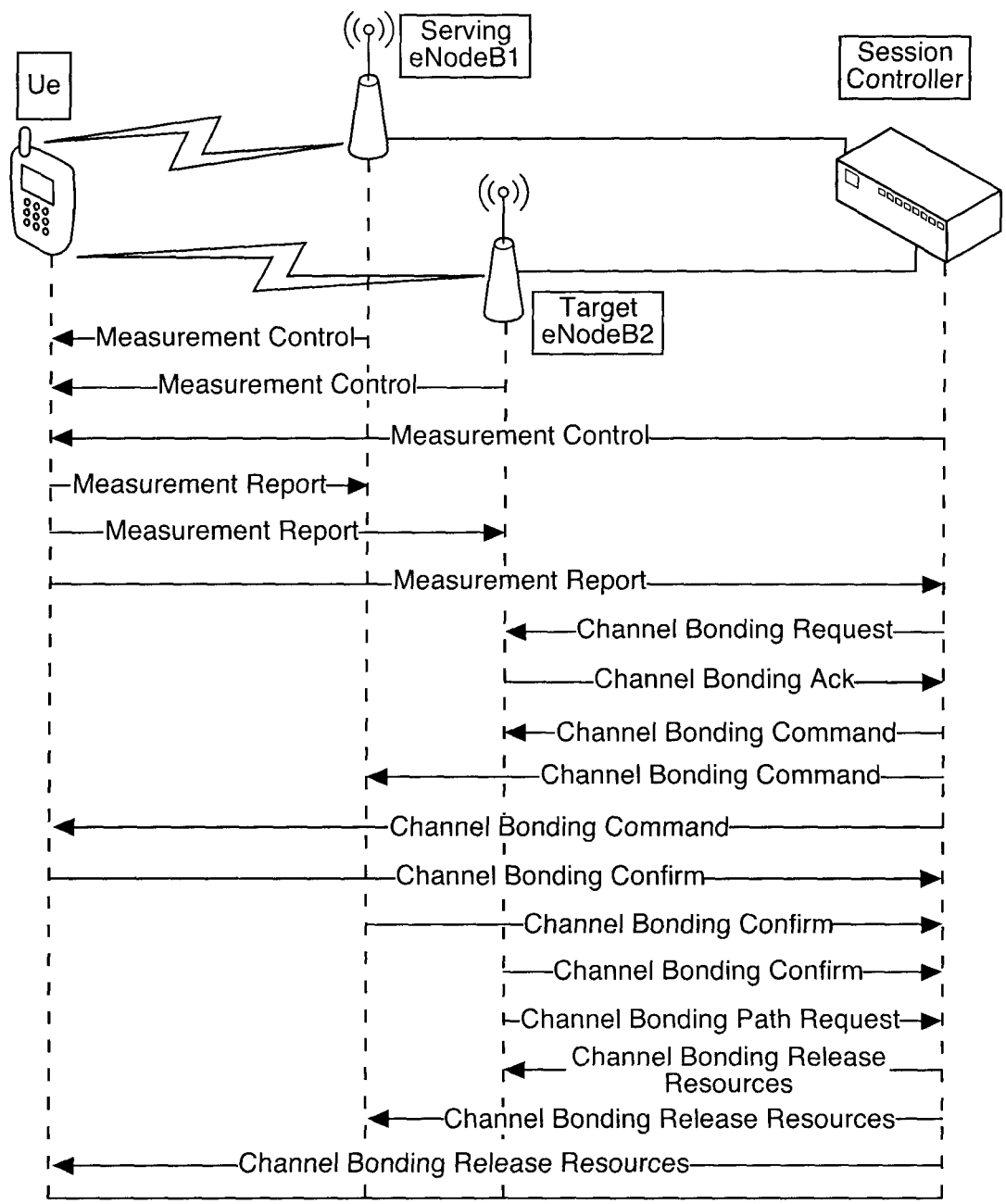
FIG. 8 illustrates possible system workflows enabled by the session manager of the present invention.

FIG. 8 illustrates controller message flow as between Ue, the nodes, and the session controller.

I-RSO Controller Channel Selection Criteria

Criteria for binding channels on disparate RANs in a given location will first be dependent on criteria with the RAN technology standard. Typical parameters include but are not limited to Reference Signal Received power, Reference Signal Received quality, Signal to Interference Noise Ratio etc.

A skilled reader will understand that various suitable algorithms may be developed in order to enable for example session controller decision-making.

I-RSO Architecture Design

By employing redundant connectivity using multiple wireless paths, availability, reliability of network resources may be improved, and higher data rates may be achieved for connected mobile devices. Multiple paths provided by multiple MNOs may enable the potential to shift traffic from broken or congested paths to higher-quality ones as traffic characteristics dynamically change, and also provide better and more efficient use of bandwidth.

Supporting integrated data services over multiple wireless paths may be referred to as multi-MNO service aggregation. In this model, users may be able to use the services of multiple MNOs simultaneously and transparently, and MNOs may be able to pool their resources to provide a better service. Considering that per-capita mobile data-usage is projected to grow at least 10,000% between 2010 and 2015, particularly driven by heavy smartphone markets, a new approach to service deployment and management that would allow more efficient use of resources would be desirable. This may be possible by pooling aggregate MNO resources in a given service area, and thus, saving the MNOs the cost of additional infrastructure expansions.

In accordance with an aspect of the present invention, there is provided a system comprising at least one I-RSO Session Controller (or RAN resource controller), and at least one I-RSO Session Host (or computer server). The I-RSO Session Controller may operate at the RAN edge of all participating Mobile Network Operators, in between RAN and Core part of the network and its functionality may include: constantly and instantaneously evaluate aggregate RF resource supply and demand for all enodeBs within a cell/Sector; appropriately allocate RF resources based on business and operational rules preloaded from the I-RSO host; deliver charging data records (CDR) to the Session Host. The I-RSO Session Host may operate at the backhaul part of the network, primarily in an administrative role, and its functionality may include: storage and loading of all operational parameters to all participating session controller; OA&M environment in support of Session Controllers, along with the Host itself; database of CDRs delivered from all associated Session Controllers; and CDR reconciliation engine to ensure RAN usage reporting is delivered accurately to the appropriate mobile network-operating (MNO) environment.

The system (I-RSO Session Controller and I-RSO Session Host) may operate in between the RAN and core parts of the network, as shown in FIG. 7, so the system must have the capability of handling signaling and control plane operations, such as frequency allocation and bandwidth sharing within the network, and data plane, which is responsible for transferring user data. To understand the I-RSO architecture requirements and challenges we should have a look at the general architecture of Evolved Packet Core ("EPC").

Evolved Packet Core (EPC) Architecture

Figure 11:
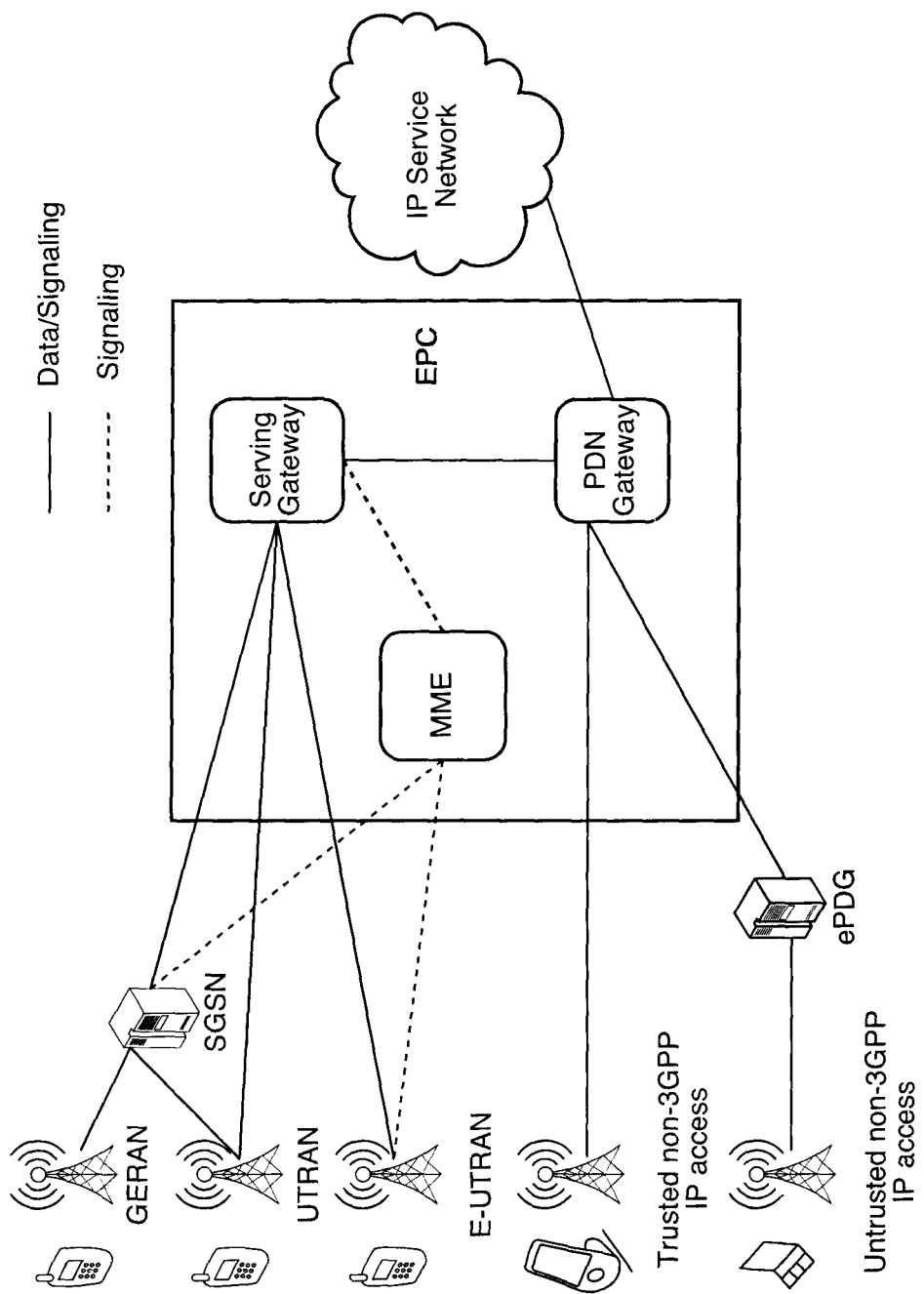
FIG. 11 illustrates an exemplary evolved packet core network.

The Evolved Packet Core, shown in FIG. 11, is made of three main network entities, described in the documents identified herein as References [1], [2], and [3]. The user data path consists of two types of nodes, the Serving Gateway (S-GW) and the PDN Gateway (P-GW). The control plane is made up of a separate Mobility-Management Entity (MME): the MME manages all the signaling (control plane); the S-GW terminates the user plane interface towards E-UTRAN; and the P-GW terminates the user plane interface towards one or more Packet Data Networks.

The other network elements linked to EPC are the following: Legacy 3GPP access: Serving GPRS Support Node (SGSN); Non-3GPP access: Evolved Packet Data Gateway (ePDG), 3GPP AAA server; Evolved UTRAN (E-UTRAN); Home eNodeB; and Policy and Charging Control architecture.

Network Traffic and Usage Scenario

Figure 12:
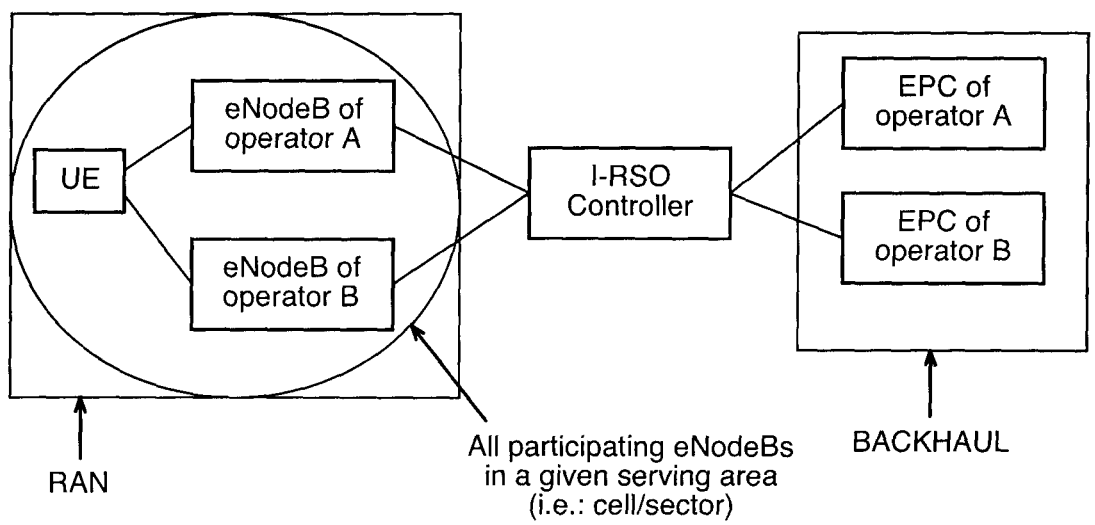
FIG. 12 illustrates a network architecture that includes a controller of the present invention.

The main benefit of multi-MNO access for the user is in the ability to aggregate the bandwidth for achieving higher rates. In other words, not only the user must be able to switch to the second MNO should the service by the first MNO is disrupted or degrades, but also the user must be able to aggregate data rates from different MNOs to achieve higher rates. In order to determine the design of the backhaul network with the I-RSO controller, a number of issues must be considered. First of all, if the I-RSO controller is placed between the eNodeB and the network core, as depicted in FIG. 12, then the I-RSO controller must have the capability of handling multiple addressing schemes to connect to several MNO simultaneously in order to be able to receive data traffic from all of them.

The user traffic handling could create a performance bottle neck as well. A large portion of Internet traffic is expected to come from video, social networking and Mobile gaming services, and the volume of this traffic is increasing exponentially. Regarding video, the sum of all forms of video (including Internet TV, Video on Demand, interactive video, and Peer-to-Peer (P2P) video streaming, mobile 3DTV, etc.) may account for up to 90 percent of consumer traffic (fixed and mobile) in 2012. Regarding social networking: Consumers are more and more using a variety of services to communicate (e.g. email, instant messaging, twitter, Facebook, video, VoIP, and a host of other social networking applications) that use a mix of voice, video and messaging. Regarding Mobile Gaming, as the handheld devices are equipped with better hardware, online mobile gaming traffic is expected to become a significant traffic contributor. Maintaining game stability among several mobile users necessitates the transmission of state updates between each mobile device with low latency.

In such case the I-RSO controller must have to deal with a large volume of real-time traffic with strict latency and quality of service requirements.

Preferred I-RSO Architectural Requirements

Without loss of generality, we use LTE-Advanced as an example here for multi-MNO service aggregation. The main architectural requirements for the I_RSO are the following: Architectural capacity bottlenecks should be avoided; I-RSO controller should fulfill all the control message flow requirements to create multiple bearer channels for the user through the networks of two or more MNOs; Enabling the efficient use of the heterogeneous network capabilities, like multi-homing (several simultaneous parallel paths, fixed-mobile, convergence), and multimode (several overlapping alternative Radio Access Technologies (RATs)); The new network element, I-RSO may have to support interoperation between IPv4 and IPv6; The I-RSO shall provide Clock synchronization signal transport over packet network to enable accurate synchronization of mobile Network Elements (NE); Host mobility (a host changes its point-of-attachment to the network), user mobility (user moves from one host to another), and session mobility (old session is restored when the user moves to a new host) shall be supported. e.g. via an aggregation of mobility protocols or a single protocol; and Use of multiple interfaces brings new challenges in different functions: Identity Management, security/privacy-preserving methods, charging, lawful interception, etc.

Figure 13:
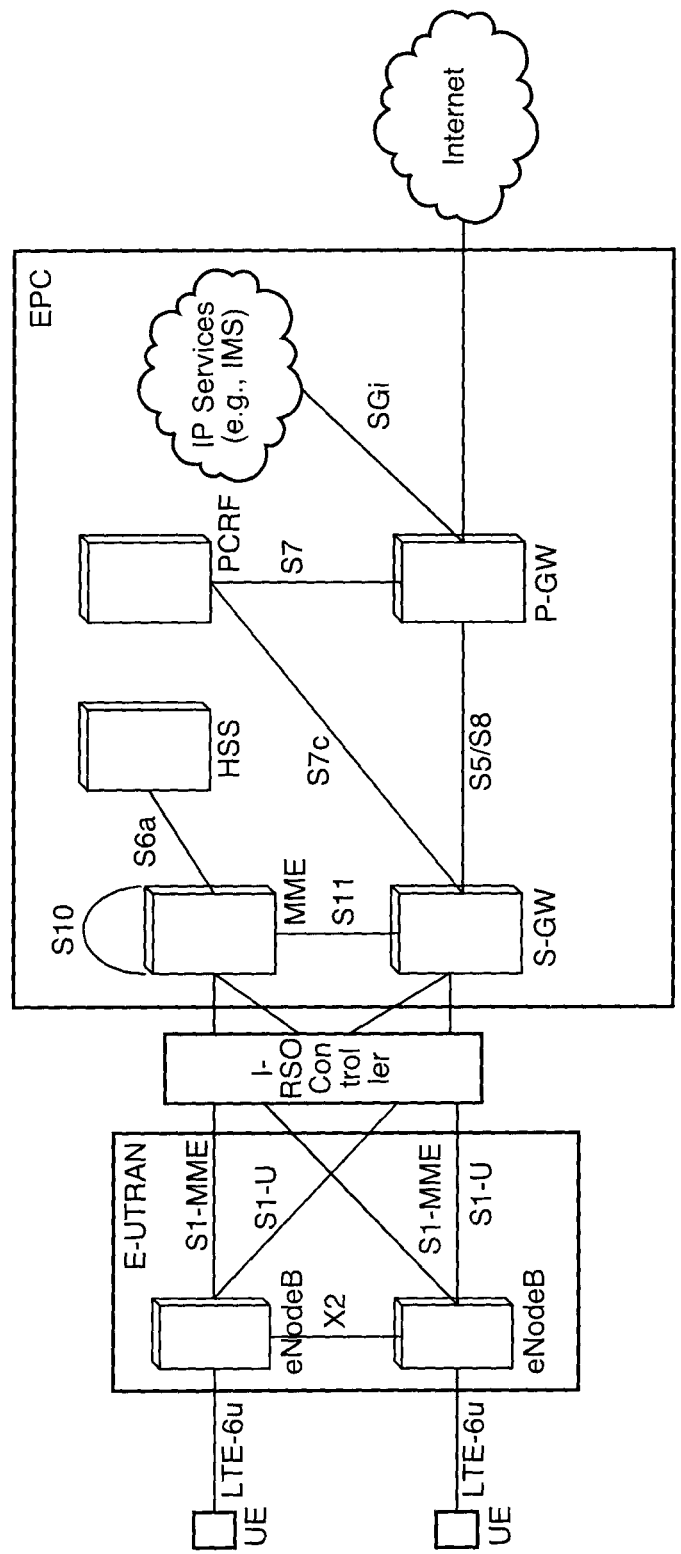
FIG. 13 illustrates a network architecture that includes a controller of the present invention.
Figure 14:
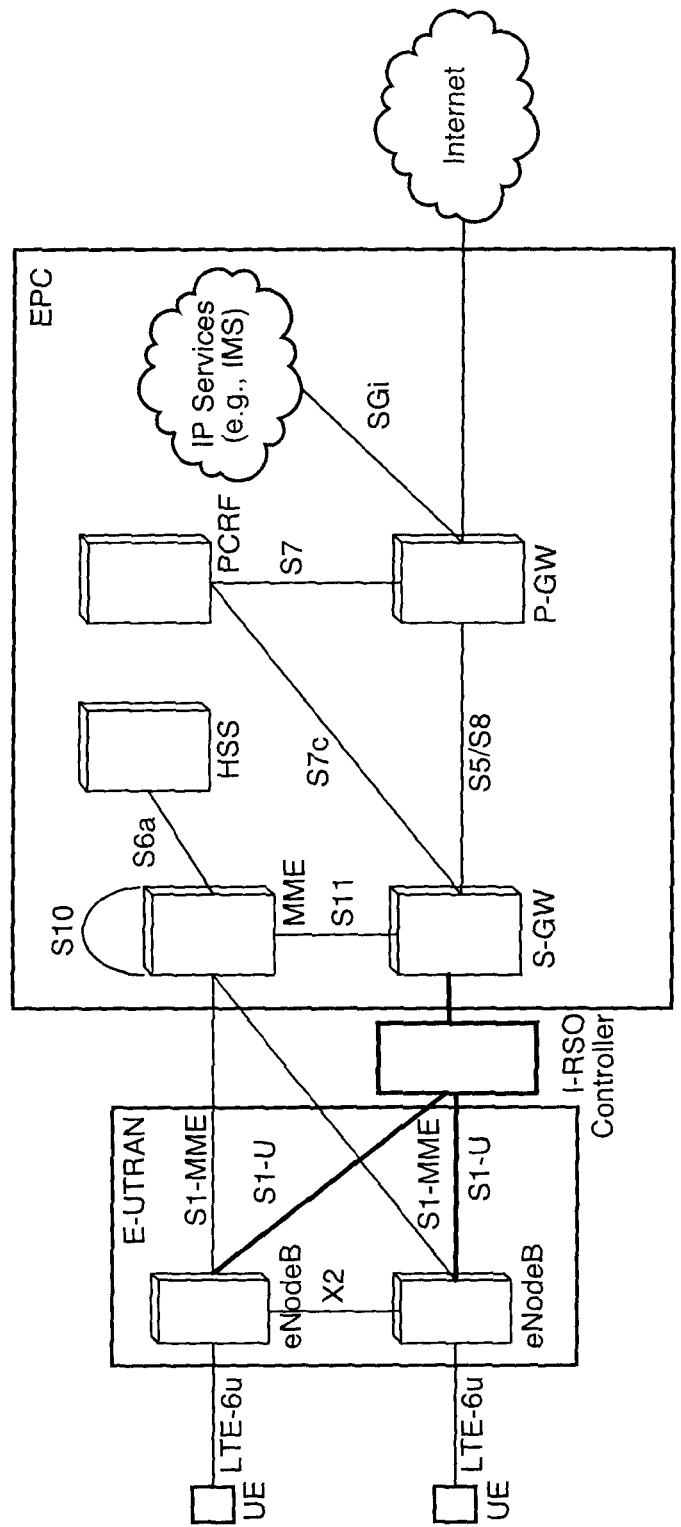
FIG. 14 illustrates a network architecture that includes a controller of the present invention.

A challenge in I-RSO design includes that the I-RSO controller will be the bottleneck for the network if it is work as a gateway in between RAN and EPC as shown in FIG. 13, because of in addition the functionality it has it must also support all the existing protocol and interfaces (for both control and data planes) to communicate between RAN and EPC. The protocols and interfaces are NAS, SCTP, S1AP, GTP-U. UDP, IP and S1-MME/C, S1-U (see Reference [4]) respectively. A possible address of addressing this issue may be to limit the involvement of the I-RSO controller in the cellular network operation to the data plane of the network (as in FIG. 14). The I-RSO may still need to implement new control messages for handling bandwidth aggregation and dynamic allocation to eNodeBs.

Figure 15:
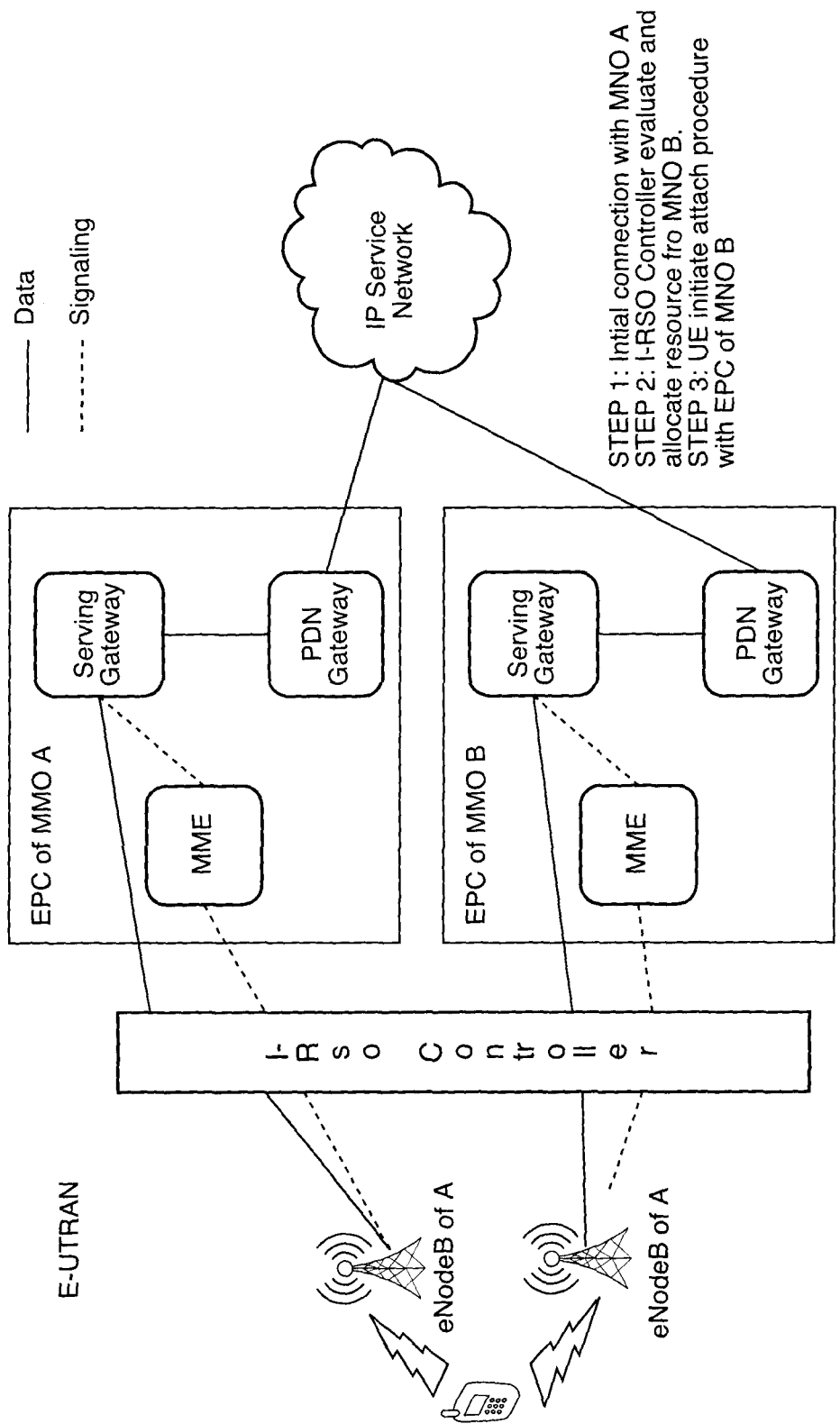
FIG. 15 illustrates a network architecture that includes a controller of the present invention.
Figure 16:
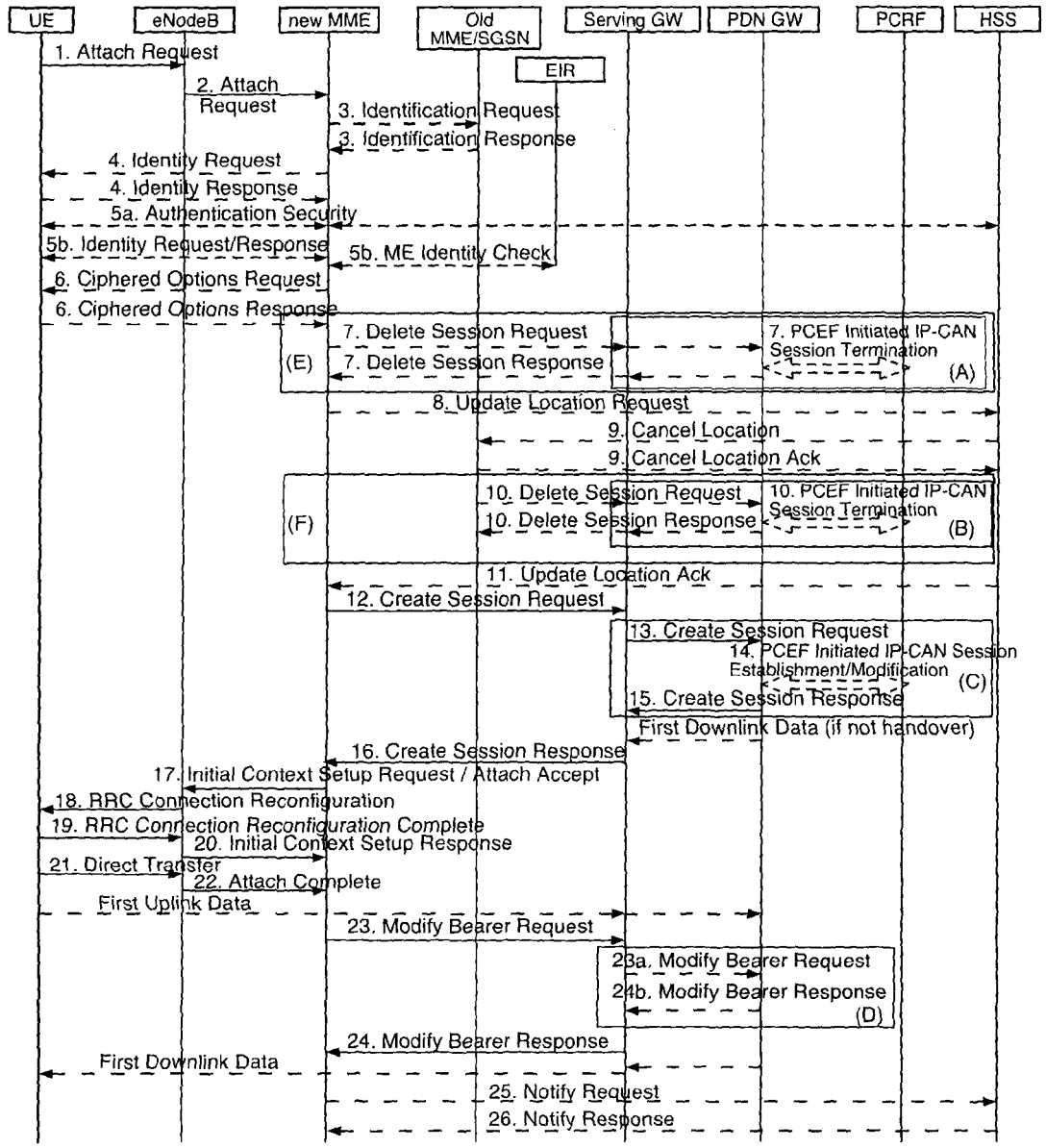
FIG. 16 illustrates a data flow diagram of an attach procedure of a user and evolved packet core network.

However, placing the I-RSO controller only in the data plane may be feasible not only due to the fact that the I-RSO controller must still manage RAN resource allocation with MME and eNodeBs, but also due to the attach procedure of LTE network, which enables the UE/user to register with the network to receive service from the corresponding MNO. To do so, I-RSO controller should inform MMEs of all MNOs to establish connection with the corresponding S-GW to establish bearer connections for the data flows as shown in FIG. 15. An example of the attach procedure in LTE is shown in FIG. 16.

Even if it is assumed that all the above mentioned challenges are addressed and multiple separate paths are established through separate MNOs, another key challenge to overcome is how those separate paths can be joined together for reliable and efficient data flow to and from both host. The fact is that providing, for example, two separate 2-Mbps channels through two different MNOs to the user, does not enable to user to receive a 4-Mbps stream. Application layer protocols such as HTTP and FTP use TCP connections for data transfer while multimedia streaming protocols such as RTP use UDP. In both cases, the application layer opens a transport socket for communication to the application at the server. These transport sockets are identified by a single IP address and port number combination on each side. While having multiple concurrent TCP connections for downloading multiple web page objects are common, TCP and UDP cannot use multiple connections for downloading a single object, such as a single video stream. This fact could significantly hamper the usability of service aggregation through multiple MNOs. The user may have 2×B bandwidth at his/her disposal, but is unable to download a single object at the 2×B data rate.

There have been efforts to introduce other transport protocols with multi-path connection capabilities instead of TCP.

Examples include Stream Control Transmission Protocol (SCTP) (see Reference [5]) and Multi-path Transmission Control Protocol (MPTCP) (see Reference [6]). But the drawback of such protocols is that they must run on both ends of the connection (client and server sides). It is feasible to implement MPTCP in the user side but implementing MPTCP in all internet servers around the world is not possible.

Another problem arises when the subscriber want to move to another cell/sector that is not under the coverage of one of the initial MNOs and need to change the MNO without interrupting the current session. This would imply that the corresponding I-RSO must also implement a handover mechanism, further complicating the design of the I-RSO controller.

The I-RSO may work as a single point of connection between RAN and EPC, and as such it can become a single point of failure by jeopardizing the whole cellular network. Placing redundant I-RSO controllers can be a potential solution but it will require special protocol and interfaces to synchronize among themselves, not to mention doubling the investment.

Another complication arises due to the fact that the serving area (cell/sector) of different MNOs varies from one another. Is should not be assumed that different MNOs eNodeB will be within a common single cell or sector and one I-RSO controller at the edge of that cell/sector.

Figure 17:
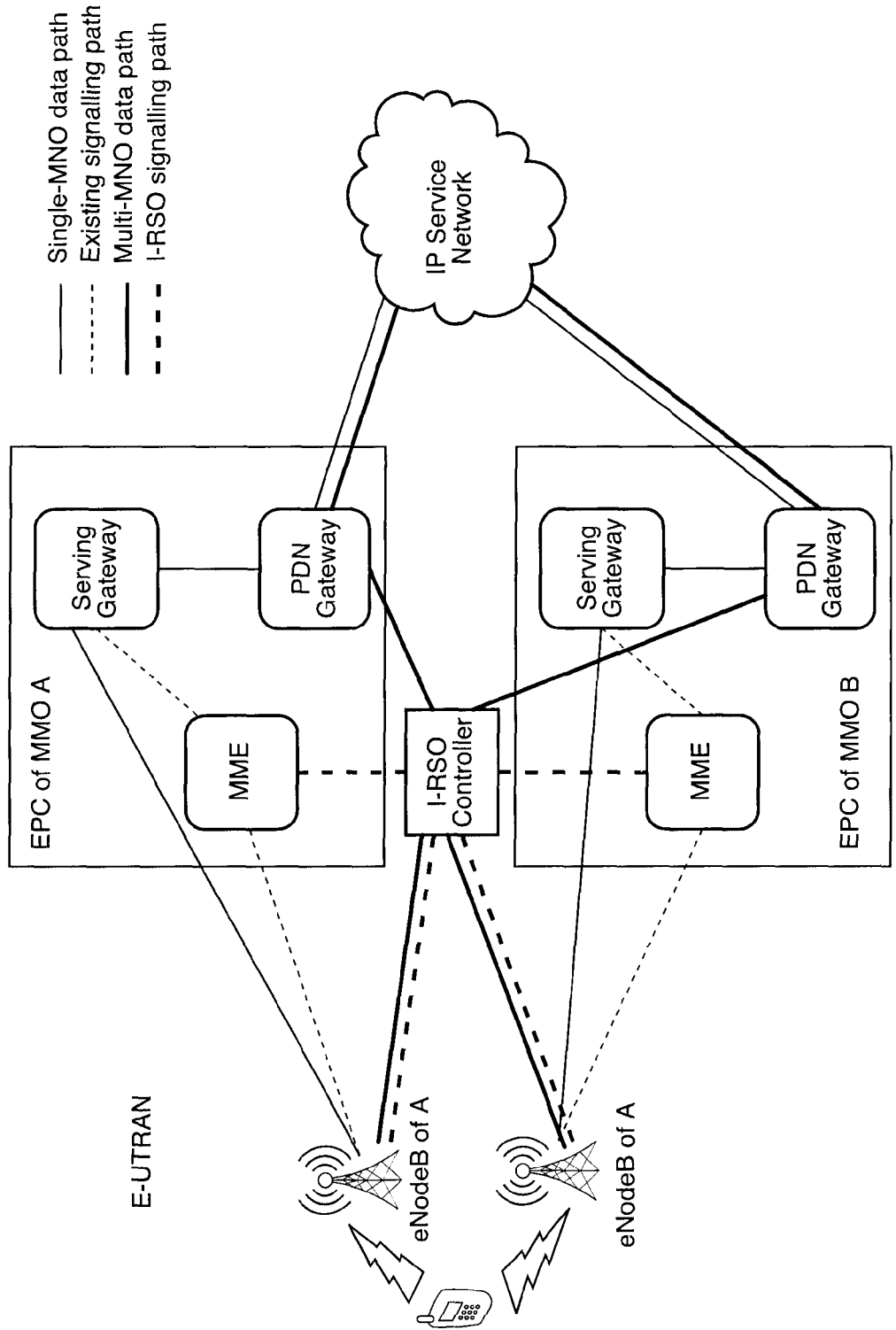
FIG. 17 illustrates a network architecture that includes a controller of the present invention.

One way to deal with the problem with multi-path transport operation is to operate the I-RSO controller as a transport layer gateway which would receive multiple transport paths from the user through different networks and then aggregates them into one transport path, as shown in FIG. 17. The I-RSO outgoing transport path could use the PDN gateway of MNO A or MNO B, or balance the load between them, or even use a direct path through an Internet service provider, bypassing the PDN gateways all together. In FIG. 17, the thin dashed lines indicate the signaling paths that already exist in the cellular network, while the thick dashed lines show the new signaling paths that may be developed for the I-RSO controller.

In this case, a decision would have to be made on which network the controller will have to use as the exit point, i.e. to connect to the destination server. Alternatively, the I-RSO controller may use an independent Internet service—separate from the networks used by MNOs—to provide this connection. If MNO core networks are used for this purpose, the controller will have to implement a decision making process for optimal usage of MNOs' core network. The administrative and billing issues regarding the data usage on each network must be handled too. The I-RSO controller would remain a performance bottleneck in the network in this case.

Alternatively, the data path gateway can be separated from the I-RSO controller and placed at different locations on the data path. Placements of such functions at SGi interface (co-located with PDN-GW) or S5 interface (co-located with S-GW) are possible options, since GTP tunneling is terminated at these locations. The advantage of this approach is to decouple the radio management control function from the service aggregation function, as well as better performance control.

In accordance with an aspect of the invention there is provided a system for optimizing network performance of a mobile device, the system comprising: at least one computer server linked to at least two Radio Access Networks ("RANs") by at least one RAN resource controller, the at least two RANs serving at least one mobile device in a predefined service area; wherein the at least one computer server is configured to: receive RAN resource utilization information for each linked RAN from the at least one RAN resource controller; determine a re-allocation of utilization of RAN resources by the at least one mobile device across the linked RANs in real-time or near real-time based at least partly on the RAN resource utilization information and on predetermined RAN resource sharing rules; generate instructions for the linked RANs in accordance with the determined re-allocation to enable the linked RANs to implement the determined RAN resource utilization re-allocation; and transmit the generated instructions to the respective RANs.

In an exemplary, non-limiting implementation, the at least one mobile device is associated with a respective one of the at least two RANs, and the determined re-allocation comprises assigning to the at least one mobile device RAN resources of at least one of the at least two RANs to which the at least one mobile device is not associated. The at least one mobile device may be associated with the respective one of the at least two RANs by a mobile device subscriber relationship. The RAN assigning may comprise assigning RAN resources to the at least one mobile device from a respective one of the linked RANs having a lower RAN resource utilization rate than the RAN associated with the at least one mobile device.

In an exemplary, non-limiting implementation, one of the computer server and the RAN resource controller is configured to associate RAN resource allocation fee information in accordance with the determined re-allocation. The at least one mobile device may be associated with a respective one of the at least two RANs. The determined re-allocation may comprise assigning to the at least one mobile device RAN resources of at least one of the at least two RANs to which the at least one mobile device is not associated. The associated RAN resource allocation fee information may comprise an allocation fee chargeable to the respective one of the at least two RANs associated with the at least one mobile device.

In an exemplary, non-limiting implementation, the RAN resource utilization information comprises supply and demand information.

In an exemplary, non-limiting implementation, the RAN resource utilization information comprises radio spectrum utilization, and the determined re-allocation comprises optimizing utilization of radio spectrum associated with at least one of the RANs.

In an exemplary, non-limiting implementation, the determined re-allocation comprises optimizing orthogonal frequency allocation across the at least one mobile device.

In an exemplary, non-limiting implementation, the predetermined RAN resource sharing rules comprise maintaining a minimum transfer rate for each of the at least one mobile device from the linked RANs.

In an exemplary, non-limiting implementation, the determined re-allocation comprises maximizing total network throughput across the linked RANs.

In an exemplary, non-limiting implementation, wherein the RAN resource sharing rules comprise generally evenly distributing network congestion across the linked RANs.

In an exemplary, non-limiting implementation, the computer server comprises or is linked to a RAN spectrum optimizer, the RAN spectrum optimizer being configured to perform the re-allocation determination.

In an exemplary, non-limiting implementation, the computer server comprises or is linked to an application layer, the application layer being configured to receive the RAN resource utilization information for each linked RAN from the at least one RAN resource controller.

In an exemplary, non-limiting implementation, the determined re-allocation comprises optimizing RAN resource utilization on a per mobile device basis.

In accordance with an aspect of the present invention, there is provided a method of optimizing network performance of a mobile device, performed by a computer server, the method comprising: receiving from at least one RAN resource controller RAN resource utilization information for at least two Radio Access Networks ("RANs") each linked to the computer server, the at least two RANs serving at least one mobile device in a predefined service area; determining a re-allocation of utilization of RAN resources by the at least one mobile device across the linked RANs in real-time or near real-time based at least partly on the RAN resource utilization information and on predetermined RAN resource sharing rules; generating instructions for the linked RANs in accordance with the determined re-allocation to enable the linked RANs to implement the determined RAN resource utilization re-allocation; and transmitting the generated instructions to the respective RANs.

In accordance with an aspect of the present invention, there is provided a non-transitory computer program product for optimizing network performance of a mobile device, the non-transitory computer program product tangibly embodying code that, when executed by a processor of a computer server, causes the processor to: receive from at least one RAN resource controller RAN resource utilization information for at least two Radio Access Networks ("RANs") each linked to the computer server, the at least two RANs serving at least one mobile device in a predefined service area; determine a re-allocation of utilization of RAN resources by the at least one mobile device across the linked RANs in real-time or near real-time based at least partly on the RAN resource utilization information and on predetermined RAN resource sharing rules; generate instructions for the linked RANs in accordance with the determined re-allocation to enable the linked RANs to implement the determined RAN resource utilization re-allocation; and transmit the generated instructions to the respective RANs.

In accordance with an aspect of the present invention, there is provided a system for optimizing network performance of a mobile device, the system comprising: at least one computer server linked to at least two Radio Access Networks ("RANs") by at least one RAN resource controller, the at least two RANs serving at least one mobile device in a predefined service area; wherein the at least one computer server is configured to: receive RAN resource utilization information for each linked RAN from the at least one RAN resource controller; and transmit the received RAN resource utilization information to each of the linked RANs; wherein the at least two RANs are respectively configured to: re-allocate utilization of RAN resources by the at least one mobile device across the linked RANs in real-time or near real-time based at least partly on the RAN resource utilization information and on predetermined RAN resource sharing rules.

In accordance with an aspect of the present invention, there is provided a method of optimizing network performance of a mobile device, the method comprising: a computer server receiving from at least one RAN resource controller RAN resource utilization information for at least two Radio Access Networks ("RANs") each linked to the computer server, the at least two RANs serving at least one mobile device in a predefined service area; the computer server transmitting the received RAN resource utilization information to each of the linked RANs; and the linked RANs respectively re-allocating utilization of RAN resources by the at least one mobile device across the linked RANs in real-time or near real-time based at least partly on the RAN resource utilization information and on predetermined RAN resource sharing rules.

Terms & Acronyms

The following terms and acronyms used in this specification may be defined as follows:

"Backhaul" means Interconnection of telecommunication network elements internal to the network and not directly touching the customer;

"CDR" means Charging Data Record;

"eNodeB" means Intelligent Radio Base Station in compliance with the LTE standard;

"EPC" means Evolved Packet Core;

"HSPA" means High Speed Packet Access;

"I-RSO" means Inter-RAN Spectrum Optimizer;

"LTE" means Long Term Evolution;

"MNO" means Mobile Network Operator;

"RAN" means Radio Access Network;

"SAE" means System Architecture Evolution;

"Wi-Fi" means Wireless LAN; and

"UMTS" means Universal Mobile Telecommunications System.

Further Details of Implementation

It should also be understood that the server computer may be implemented as one or more servers in any possible server architecture or configuration including for example in a distributed server architecture, a server farm, or a cloud based computing environment.

Figure 9:
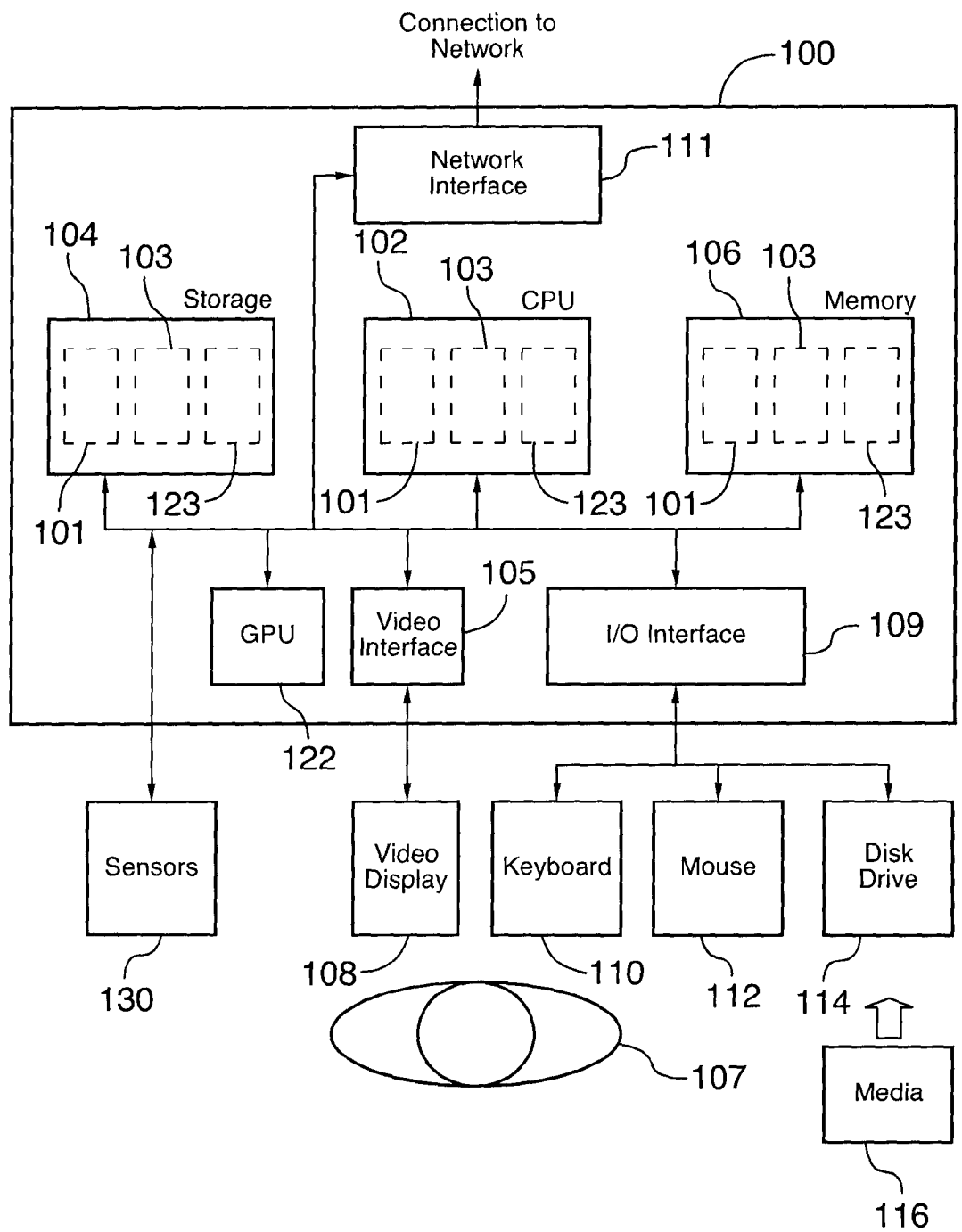
FIG. 9 includes a possible generic implementation of the computer system or platform of the present invention.

The present system and method may be practiced in various embodiments. A suitably configured computer device, and associated communications networks, devices, software and firmware may provide a platform for enabling one or more embodiments as described above. By way of example, FIG. 9 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 130 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

It will be appreciated by those skilled in the art that other variations of the embodiments described herein may also be practiced without departing from the scope of the invention. Other modifications are therefore possible.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

REFERENCES

References cited in this specification may include the following, the entirety of each of which is incorporated by reference herein:

[1] 3GPP, "Network Architecture," TS 23.002, Release 10;
[2] 3GPP, "General Packet Radio Service (GPRS) enhancements for Evolved Universal Terrestrial Radio Access Network (E-UTRAN) access," TS 23.401, release 10;
[3] 3GPP, "Architecture enhancements for non-3GPP accesses," TS 23.402, release 10;
[4] 3GPP, "LTE, General Packet Radio Service (GPRS) enhancement for Evolved Universal Terrestrial Radio Access Network (E-UTRAN) access," TS 23.401, Version 11.5.0, Release 11;
[5] P. Lescuyer and T. Lucidarme, "Evolved Packet System (EPS): The LTE and SAE Information of 3G UMTS," 2008; and
[6] A. Ford, C. Raicu, M. Handley, S. Barre, and J. Iyengar, "Architectural Guidelines for Multipath TCP Development," RFC 6182, 2011.

What is claimed is:

1. A system for optimizing network performance of a mobile device, the system comprising:
at least one computer server linked to at least two Radio Access Networks ("RANs") by at least one RAN resource controller, the at least two RANs serving at least one mobile device in a predefined service area;
wherein the at least one computer server is configured to:
receive RAN resource utilization information for each linked RAN from the at least one RAN resource controller;
determine a re-allocation of utilization of RAN resources by the at least one mobile device across the linked RANs in real-time or near real-time based at least partly on the RAN resource utilization information and on predetermined RAN resource sharing rules;
generate instructions for the linked RANs in accordance with the determined re-allocation to enable the linked RANs to implement the determined RAN resource utilization re-allocation; and
transmit the generated instructions to the respective RANs.

2. The system of claim 1 wherein the at least one mobile device is associated with a respective one of the at least two RANs, and the determined re-allocation comprises assigning to the at least one mobile device RAN resources of at least one of the at least two RANs to which the at least one mobile device is not associated.

3. The system of claim 2 wherein the at least one mobile device is associated with the respective one of the at least two RANs by a mobile device subscriber relationship.

4. The system of claim 2 wherein the RAN assigning comprises assigning RAN resources to the at least one mobile device from a respective one of the linked RANs having a lower RAN resource utilization rate than the RAN associated with the at least one mobile device.

5. The system of claim 1 wherein one of the computer server and the RAN resource controller is configured to associate RAN resource allocation fee information in accordance with the determined re-allocation.

6. The system of claim 5 wherein:
the at least one mobile device is associated with a respective one of the at least two RANs;
the determined re-allocation comprises assigning to the at least one mobile device RAN resources of at least one of the at least two RANs to which the at least one mobile device is not associated; and
the associated RAN resource allocation fee information comprises an allocation fee chargeable to the respective one of the at least two RANs associated with the at least one mobile device.

7. The system of claim 1 wherein the RAN resource utilization information comprises supply and demand information.

8. The system of claim 1 wherein the RAN resource utilization information comprises radio spectrum utilization, and the determined re-allocation comprises optimizing utilization of radio spectrum associated with at least one of the RANs.

9. The system of claim 1 wherein the determined re-allocation comprises optimizing orthogonal frequency allocation across the at least one mobile device.

10. The system of claim 1 wherein the predetermined RAN resource sharing rules comprise maintaining a minimum transfer rate for each of the at least one mobile device from the linked RANs.

11. The system of claim 1 wherein the determined re-allocation comprises maximizing total network throughput across the linked RANs.

12. The system of claim 1 wherein the RAN resource sharing rules comprise generally evenly distributing network congestion across the linked RANs.

13. The system of claim 1 wherein the computer server comprises or is linked to a RAN spectrum optimizer, the RAN spectrum optimizer being configured to perform the re-allocation determination.

14. The system of claim 1 wherein the computer server comprises or is linked to an application layer, the application layer being configured to receive the RAN resource utilization information for each linked RAN from the at least one RAN resource controller.

15. The system of claim 1 wherein the determined re-allocation comprises optimizing RAN resource utilization on a per mobile device basis.

16. A method of optimizing network performance of a mobile device, performed by a computer server, the method comprising:
receiving from at least one RAN resource controller RAN resource utilization information for at least two Radio Access Networks ("RANs") each linked to the computer server, the at least two RANs serving at least one mobile device in a predefined service area;
determining a re-allocation of utilization of RAN resources by the at least one mobile device across the linked RANs in real-time or near real-time based at least partly on the RAN resource utilization information and on predetermined RAN resource sharing rules;
generating instructions for the linked RANs in accordance with the determined re-allocation to enable the linked RANs to implement the determined RAN resource utilization re-allocation; and
transmitting the generated instructions to the respective RANs.

17. A non-transitory computer program product for optimizing network performance of a mobile device, the non-transitory computer program product tangibly embodying code that, when executed by a processor of a computer server, causes the processor to:
receive from at least one RAN resource controller RAN resource utilization information for at least two Radio Access Networks ("RANs") each linked to the computer server, the at least two RANs serving at least one mobile device in a predefined service area;
determine a re-allocation of utilization of RAN resources by the at least one mobile device across the linked RANs in real-time or near real-time based at least partly on the RAN resource utilization information and on predetermined RAN resource sharing rules;
generate instructions for the linked RANs in accordance with the determined re-allocation to enable the linked RANs to implement the determined RAN resource utilization re-allocation; and
transmit the generated instructions to the respective RANs.

18. A system for optimizing network performance of a mobile device, the system comprising:
at least one computer server linked to at least two Radio Access Networks ("RANs") by at least one RAN resource controller, the at least two RANs serving at least one mobile device in a predefined service area;
wherein the at least one computer server is configured to:
receive RAN resource utilization information for each linked RAN from the at least one RAN resource controller; and
transmit the received RAN resource utilization information to each of the linked RANs;
wherein the at least two RANs are respectively configured to:
re-allocate utilization of RAN resources by the at least one mobile device across the linked RANs in real-time or near real-time based at least partly on the RAN resource utilization information and on predetermined RAN resource sharing rules.

19. A method of optimizing network performance of a mobile device, the method comprising:
a computer server receiving from at least one RAN resource controller RAN resource utilization information for at least two Radio Access Networks ("RANs") each linked to the computer server, the at least two RANs serving at least one mobile device in a predefined service area;
the computer server transmitting the received RAN resource utilization information to each of the linked RANs; and
the linked RANs respectively re-allocating utilization of RAN resources by the at least one mobile device across the linked RANs in real-time or near real-time based at least partly on the RAN resource utilization information and on predetermined RAN resource sharing rules.

\* \* \* \* \*